(12) United States Patent
Zhao et al.

(10) Patent No.: US 8,805,201 B2
(45) Date of Patent: *Aug. 12, 2014

(54) TIME SYNCHRONIZATION METHOD AND DEVICE IN PASSIVE OPTICAL NETWORK AND PASSIVE OPTICAL NETWORK

(75) Inventors: Jun Zhao, Shenzhen (CN); Sanzhong Li, Shenzhen (CN); Meng Sui, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/561,413

(22) Filed: Jul. 30, 2012

(65) Prior Publication Data
US 2012/0301147 A1 Nov. 29, 2012

Related U.S. Application Data

(63) Continuation of application No. 12/570,125, filed on Sep. 30, 2009, now Pat. No. 8,335,437, which is a continuation of application No. PCT/CN2009/073188, filed on Aug. 11, 2009.

(30) Foreign Application Priority Data

Aug. 13, 2008 (CN) .......................... 2008 1 0118185
Jan. 13, 2009 (CN) .......................... 2009 1 0003640
Feb. 28, 2009 (CN) .......................... 2009 1 0126119

(51) Int. Cl.
*H04B 10/00* (2013.01)

(52) U.S. Cl.
USPC ............... 398/154; 398/58; 398/66; 398/155; 370/503

(58) Field of Classification Search
USPC .............. 398/25, 58–75, 98, 154, 155, 167.5; 370/395, 395.5, 503
See application file for complete search history.

(56) References Cited

U.S. PATENT DOCUMENTS 7,991,296 B1 * 8/2011 Johnston et al. .............. 398/154
2003/0039272 A1 2/2003 Dudziak et al.
(Continued)

FOREIGN PATENT DOCUMENTS

CN 1845546 A 10/2006
CN 101080889 A 11/2007
(Continued)

OTHER PUBLICATIONS

Li et al: "Proposed PLOAM messaging for phase synchronization in GPON system", IEEE meeting, Tokyo, Apr. 2008.*

(Continued)

*Primary Examiner* — Li Liu
(74) *Attorney, Agent, or Firm* — Huawei Technologies Co., Ltd.

(57) ABSTRACT

A time synchronization method and a time synchronization device in a passive optical network (PON), and a PON are provided. The method includes receiving a synchronization packet sent after time synchronization of an optical line terminal (OLT) with a master clock (MC) is achieved, wherein the synchronization packet carries a timestamp TMt1$i$ determined after the time synchronization of the OLT is achieved, adjusting a local clock according to the timestamp to achieve time synchronization of an optical network unit/optical network terminal (ONU/ONT) with the OLT, and after the time synchronization of the OLT is achieved, instructing an slave clock (SC) to perform time synchronization. A time synchronization device and a time synchronization system for implementing the method in a PON are further provided.

21 Claims, 10 Drawing Sheets

(56) References Cited

U.S. PATENT DOCUMENTS

| | | |
|---|---|---|
| 2005/0078682 A1 | 4/2005 | Kim et al. |
| 2008/0117938 A1 | 5/2008 | Erich et al. |
| 2009/0067850 A1 | 3/2009 | Mizutani et al. |
| 2009/0162065 A1* | 6/2009 | Mizutani et al. .............. 398/66 |
| 2009/0226170 A1* | 9/2009 | Zou ............................... 398/79 |

FOREIGN PATENT DOCUMENTS

| | | |
|---|---|---|
| CN | 101145846 A | 3/2008 |
| CN | 201039198 Y | 3/2008 |
| CN | 101232457 A | 7/2008 |
| KR | 20040063453 A | 7/2004 |

OTHER PUBLICATIONS

Boomsma: "Ethernet over Passive Optical Networks", Master Thesis, May 2006.*

IEEE P1588™ D2.2, "Draft Standard for a Precision Clock Synchronization Protocol for Networked Measurement and Control Systems", dated 2007, total 301 pages.

ITU T Telecommunication: "Series G: Transmission Systems and Media, Digital Systems and Networks Digital sections and digital line system—Optical line systems for local and access networks", G.984.3, Amendment 1, dated Jul. 2005, total 40 pages.

ITU T Telecommunication: "Series G: Transmission Systems and Media, Digital Systems and Networks Digital sections and digital line system—Optical line systems for local and access networks", G.984.3, Amendment 2, dated Mar. 2006, total 8 pages.

ITU T Telecommunication: "Series G: Transmission Systems and Media, Digital Systems and Networks Digital sections and digital line system—Optical line systems for local and access networks", G.984.3, Amendment 3, dated Dec. 2006, total 6 pages.

ZTE Corp:"Proposed PLOAM messaging for phase synchronization in GPON system", dated Apr. 17-18, 2008, total 10 pages.

* cited by examiner

TIME SYNCHRONIZATION METHOD AND DEVICE IN PASSIVE OPTICAL NETWORK AND PASSIVE OPTICAL NETWORK

CROSS-REFERENCE TO RELATED APPLICATIONS

This application is a continuation of U.S. patent application Ser. No. 12/570,125, filed on Sep. 30, 2009, which is a continuation of International Application No. PCT/CN2009/073188 filed on Aug. 11, 2009. The International Application claims priority to Chinese patent application No. 200810118185.0, filed on Aug. 13, 2008. Chinese patent application No. 200910003640.7, filed on Jan. 13, 2009 and Chinese patent application No. 200910126119.2, filed on Feb. 28, 2009. The afore-mentioned patent applications are hereby incorporated by reference in their entireties.

FIELD OF THE TECHNOLOGY

The present disclosure relates to the field of communication technology, and more particularly to a time synchronization method and a time synchronization device in a passive optical network (PON) and a PON.

BACKGROUND

A passive optical network (PON) technology is a point to multi-point optical fiber transmission and access technology. In a PON system, the transmission from an optical line terminal (OLT) to an optical network unit/optical network terminal (ONU/ONT) is in a downlink direction, which utilizes a time division multiplex (TDM) technology, and the transmission from an ONU/ONT to an OLT is in an uplink direction, which utilizes a time division multiple access (TDMA) technology. In a whole network, clocks are categorized into a master clock (MC) and a slave clock (SC) according to communication relationships. Usually, a clock with optimal stability, accuracy, and definitiveness in a network is the MC, and another clock or a plurality of other clocks that needs to be synchronized with the MC is the SC. In order to ensure time synchronization for all equipment in the PON system, it needs to be ensured that the MC and SC have the same time.

In order to ensure that the equipment has the same time, in the prior art, a time synchronization method in a PON is provided. Messages sent in the method are described in the Precision Time Protocol (PTP). As shown in FIG. 1, the method includes the following steps.

In Step 11, an MC sends a PTP_SYNC_MESSAGE and a PTP_FOLLOWUP_MESSAGE to an SC. The PTP_FOLLOWUP_MESSAGE carries time TM1 at which the MC sends the PTP_SYNC_MESSAGE.

In Step 12, the SC receives the PTP_SYNC_MESSAGE and the PTP_FOLLOWUP_MESSAGE, records the time TS1 at which the PTP_SYNC_MESSAGE is received, and obtains the time TM1 from the PTP_FOLLOWUP_MESSAGE.

In Step 13, the SC sends a PTP_DELAY_REQ_MESSAGE to the MC at TS2.

In Step 14, the MC receives the PTP_DELAY_REQ_MESSAGE and returns a PTP_DELAY_RESP_MESSAGE, and the time TM2 at which the PTP_DELAY_REQ_MESSAGE is received is carried in the PTP_DELAY_RESP_MESSAGE.

In Step 15, the SC receives the PTP_DELAY_RESP_MESSAGE, obtains the time TM2, and calculates a DELAY from the MC to the SC.

In this step, a formula for calculating the DELAY may be $$DELAY=[(TM2-TS2)+(TS1-TM1)]/2=(Td1+Td3+Td4+Td4+Td2+Td1)/2.$$

where $Td1$ is a delay from the MC to the OLT, $Td2$ is a delay from the OLT to the ONU/ONT, $Td3$ is a delay from the ONU/ONT to the OLT, and $Td4$ is a delay from the ONU/ONT to the SC. $Td2+Td3$ equals a logic loop delay. According to the Gigabit PON (GPON) standard, the logic loop delay is 600 μs, and the DELAY may be written as $DELAY=Td1+Td4+300$ μs.

In Step 16, the SC performs clock adjustment according to the calculated DELAY.

The formulas for calculating the DELAY are described in related IEEE 1588 specifications.

In the method for calculating a delay in the prior art, it is assumed that in the PTP, the delay from the MC to the SC and the delay from the SC to the MC are the same. Actually, the delay from the MC to the SC and the delay from the SC to the MC may not be the same. Therefore, the calculated delay may be inaccurate, and the time of the SC and the MC may be asynchronous.

SUMMARY

The present disclosure provides various embodiments of a time synchronization method and a time synchronization device in a passive optical network (PON), which realize time synchronization between a master clock (MC) and a slave clock (SC).

One embodiment of the present disclosure provides a time synchronization method in a PON. The PON includes an optical line terminal (OLT) and a plurality of optical network units/optical network terminals (ONU/ONTs). The method includes the following steps:

A synchronization packet sent by the OLT after time synchronization of the OLT with an MC is received, in which the synchronization packet carries a timestamp TMt1$i$ determined after the time synchronization of the OLT is completed.

A local clock is adjusted according to the timestamp TMt1$i$ to achieve time synchronization between the ONU/ONTs and the OLT.

After the time synchronization with the OLT is achieved, an SC is instructed to achieve time synchronization.

One embodiment of the present disclosure provides a time synchronization device in a PON, which includes a receiving unit, an adjusting unit, and an instructing unit.

The receiving unit is configured to receive a synchronization packet sent after time synchronization of an OLT with an MC in the PON is achieved, in which the synchronization packet carries a timestamp TMt1$i$ determined after the time synchronization of the OLT is achieved.

The adjusting unit is configured to adjust a local clock according to the timestamp to achieve the time synchronization of the ONU/ONT with the OLT in the PON.

The instructing unit is configured to instruct the SC to perform time synchronization after the time synchronization with the OLT is achieved.

One embodiment of the present disclosure further provides an OLT. The OLT includes a synchronizing unit and a sending unit. The synchronizing unit is configured to achieve time synchronization with an MC. The sending unit is configured to send a synchronization packet to an ONU/ONT after the time synchronization is achieved, in which the synchronization packet carries a timestamp TMt1$i$ determined after the time synchronization of the OLT is achieved.

One embodiment of the present disclosure further provides a PON. The PON includes an ONU/ONT and an OLT.

The OLT is configured to achieve time synchronization with an MC, and send a synchronization packet carrying a timestamp TMt1$i$ to the ONU/ONT after the time synchronization is achieved, in which the timestamp TMt1$i$ indicates time of the OLT when the synchronization packet or a header of a downlink frame is sent after the time synchronization is achieved.

The ONU/ONT is configured to receive the synchronization packet, adjust a local clock according to the timestamp TMt1$i$ carried in the synchronization packet to achieve time synchronization of the ONU/ONT with the OLT, and instruct an SC to perform time synchronization after the time synchronization with the OLT is achieved.

As can be seen from the above technical solutions, a synchronization packet sent by an OLT is received, a local clock is adjusted according to the synchronization packet, and an SC is instructed to perform time synchronization after time synchronization with the OLT is achieved. Thus, in the case that a delay from an MC to the SC and a delay from the SC to the MC are different, the time synchronization between the MC and the SC is achieved, thereby satisfying the demand for time synchronization in the PON.

DETAILED DESCRIPTION OF THE EMBODIMENTS

In an embodiment, a time synchronization method in a passive optical network (PON) is provided. In the method, a synchronization packet sent after time synchronization of an optical line terminal (OLT) with a master clock (MC) is achieved is received. The synchronization packet carries a timestamp. A local clock is adjusted according to the timestamp. After the time synchronization with the OLT is achieved, a slave clock (SC) is instructed to perform time synchronization. The method may be implemented by an optical network unit/optical network terminal (ONU/ONT). As can be seen from the technical solution of the method, in the embodiment of the present disclosure, after the time synchronization of the OLT with the MC is achieved, the time synchronization between the OLT and the ONU/ONT is performed, that is, the time synchronization of the ONU/ONT with the MC is performed. After the time synchronization of the ONU/ONT, the SC is instructed to perform time synchronization with the ONU/ONT. Therefore, in the case that a delay from the MC to the SC and a delay from the SC to the MC are different, the time synchronization between the MC and the SC is achieved, thereby satisfying the demand for time synchronization in the PON.

A method, a device, and a system provided in the embodiments of the present disclosure are further illustrated with reference to specific embodiments and the accompanying drawings.

Figure 1:
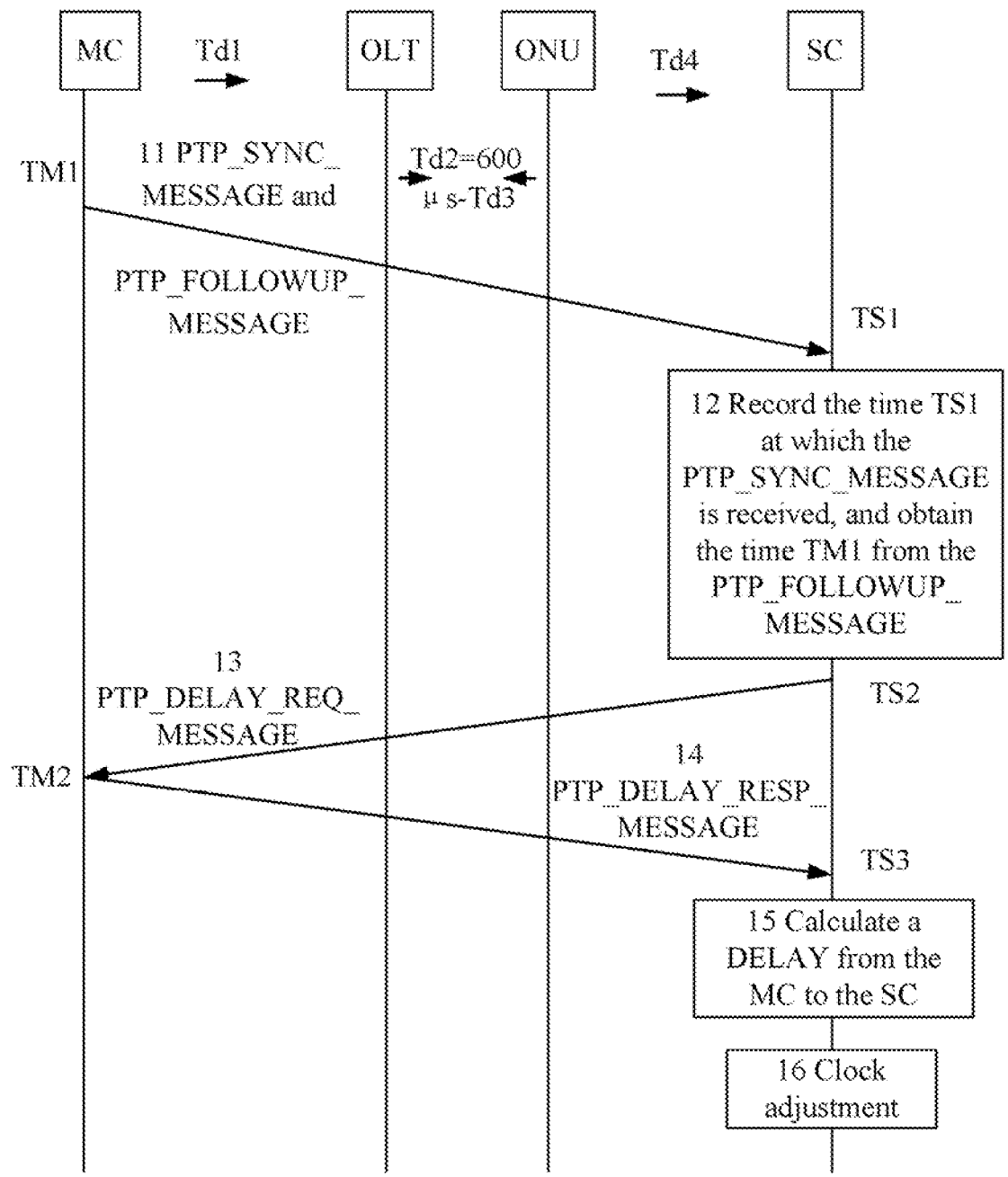
FIG. 1 is a flow chart of a time synchronization method in a PON in the prior art.
Figure 2:
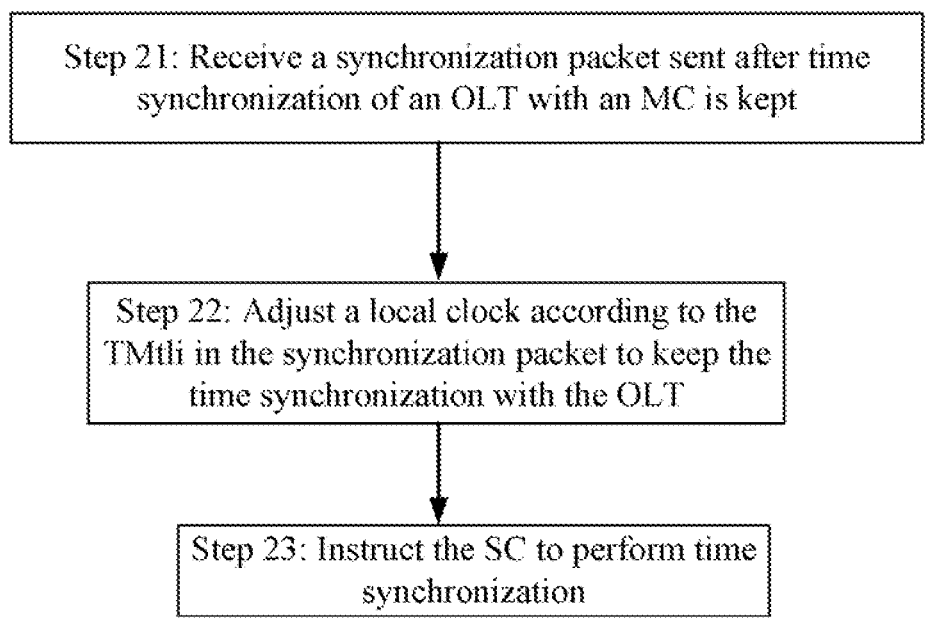
FIG. 2 is a flow chart of a time synchronization method in a PON according to a first embodiment of the present disclosure.

In a first embodiment, a time synchronization method in a PON is provided. In this embodiment, a technical scenario is that the PON is a Gigabit PON (GPON). As shown in FIG. 2, the method includes the following steps.

In Step 21, a synchronization packet sent after time synchronization of an OLT with an MC is achieved is received. The synchronization packet carries a timestamp TMt1$i$, which is determined after the time synchronization of the OLT is achieved.

The time synchronization of the OLT with the MC is achieved through a Precision Time Protocol (PTP) synchronization mechanism. A specific implementation method of the PTP synchronization mechanism is described in the IEEE 1588 protocol.

An external clock source serves as an MC, such as a Background Intelligent Transfer Service (BITS) or a Global Positioning System (GPS) clock source directly connected to the OLT. The OLT realizes the synchronization with the MC through a time synchronization circuit of the OLT.

In this step, the TMt1$i$ is generated at the OLT in different modes according to different types of the synchronization packet.

When the OLT sends a unicast synchronization packet, TMt1$i$=TMt1$i$+Tdi, in which TMt1 is the time at which the synchronization packet is sent, and Tdi is a downlink delay from the OLT to a destination ONU/ONT (for example, an $i^{th}$ ONU/ONT). Of course, in actual situations, TMt1$i$ may also be the TMt1. Also, TMt1$i$ may even be further expressed as TMt1$i$=TMt1+Tdi+Tc, in which Tc is a certain compensation value dynamically or statically set as required, and may be 0.

When the OLT sends a broadcast or multicast synchronization packet, TMt1$i$=TMt1.

In Step 22, a local clock is adjusted according to the timestamp TMt1$i$ in the synchronization packet, so as to achieve the time synchronization with the OLT.

The local clock is a clock of an intermediate node in a route between the OLT and the SC. For example, the local clock may be a clock of the ONU/ONT. After the time synchronization of the OLT with the MC is achieved, the time synchronization between the ONU/ONT and the OLT is equivalent to the time synchronization between the ONU/ONT and the MC.

This step may also be implemented by the ONU/ONT. A method for implementing this step may be as follows.

When TMt1$i$=TMt1+Tdi, the local clock is adjusted through Method A or Method B, so as to achieve the time synchronization with the OLT.

In Method A, the ONU/ONT adjusts a local clock TSu1 to TMt1$i$ directly. In Method B, the ONU/ONT adjusts the local clock TSu1 to TMt1$i$+Tpi, in which Tpi indicates the time for which the ONU/ONT processes the synchronization packet.

When TMt1$i$=TMt1, regardless whether the synchronization packet is a multicast packet or a unicast packet, the local clock is adjusted through Method C or Method D, so as to achieve the time synchronization with the OLT.

In Method C, the ONU/ONT adjusts the local clock TSu1 to TMt1+(Tlr−Teqdi)/2, in which Tlr is a system logic loop delay, Teqdi is a compensation delay, and (Tlr−Teqdi)/2 indicates a downlink delay from the OLT to the destination ONU/ONT (for example, the $i^{th}$ ONU/ONT), that is, Tdi=(Tlr−Teqdi)/2. When the system is the GPON, Tlr may be selected as 600 µs, and Teqdi is a compensation delay configured for the ONU/ONT by the OLT through a Ranging-Time Physical Layer Operations, Administration and Maintenance (PLOAM) message after distance ranging is completed. When the system is an Ethernet Passive Optical Network (EPON) system, the OLT sends Tdi to the ONU/ONT through a downlink packet, for example, a downlink Multi-Point Control Protocol (MPCP) packet.

In Method D, the ONU/ONT adjusts the local clock TSu1 to TMt1+(Tlr−Teqdi)/2+Tpi, in which Tpi indicates the time for which the ONU/ONT processes the synchronization packet. (Tlr−Teqdi)/2 indicates a downlink delay from the OLT to the destination ONU/ONT (for example, the $i^{th}$ ONU/ONT), that is.

$$Tdi=(Tlr-Teqdi)/2.$$

In Step 23, the SC is instructed to perform time synchronization.

An implementation method of this step may be to perform time synchronization through the PTP synchronization mechanism.

In the method provided in the first embodiment, the synchronization packet sent by the OLT is received, the local clock is adjusted according to the synchronization packet, and the SC is instructed to perform time synchronization after the time synchronization with the OLT is achieved. Therefore, in the case that the delay from the MC to the SC and the delay from the SC to the MC are different, the time synchronization between the MC and the SC is achieved, thereby satisfying the demand for time synchronization in the PON.

In a second embodiment, a time synchronization method in a PON is provided. A technical scenario in this embodiment is that the PON is a GPON. The synchronization packet is a unicast packet. In this embodiment, a timestamp carried in the synchronization packet is TMt1$i$=TMt1+Tdi. A structure of the synchronization packet is as shown in Table 1.

TABLE 1

| Ocet | Content | Description |
|------|---------|-------------|
| 1 | ONU-ID | Adress to one ONU |
| 2 | Message-ID | Message ID, identify SYC PLOAM |
| ... | | |
| i | sssssss | MSB of seconds, original timestamp |
| i + 1 | sssssss | LSB of seconds, original timestamp |
| i + 2 | nnnnnnnn | MSB of nanoseconds, original timestamp |
| i + 3 | nnnnnnnn | |
| i + 4 | nnnnnnnn | |
| i + 5 | nnnnnnnn | LSB of nanoseconds, original timestamp |
| ... | rrrrrrrr | reserved |
| 12 | rrrrrrrr | reserved |

The structure of the synchronization packet in Table 1 is an exemplary embodiment of the present disclosure. In Table 1, ONU-identity (ID) is used to identify a destination ONU/ONT of the synchronization packet; a value of the Message-ID field is used to identify that the message/packet is a SYN_PLOAM message/packet; and i to i+5 indicate timestamps. In actual situations, other modes may also exist. For example, only "second" field is included or more time unit fields are included. The length of each field may be randomly specified depending on actual demand. For example, all the 6 fields are "second" fields. Alternatively, a packet format similar to that of a GPON OMCI is used.

Figure 3:
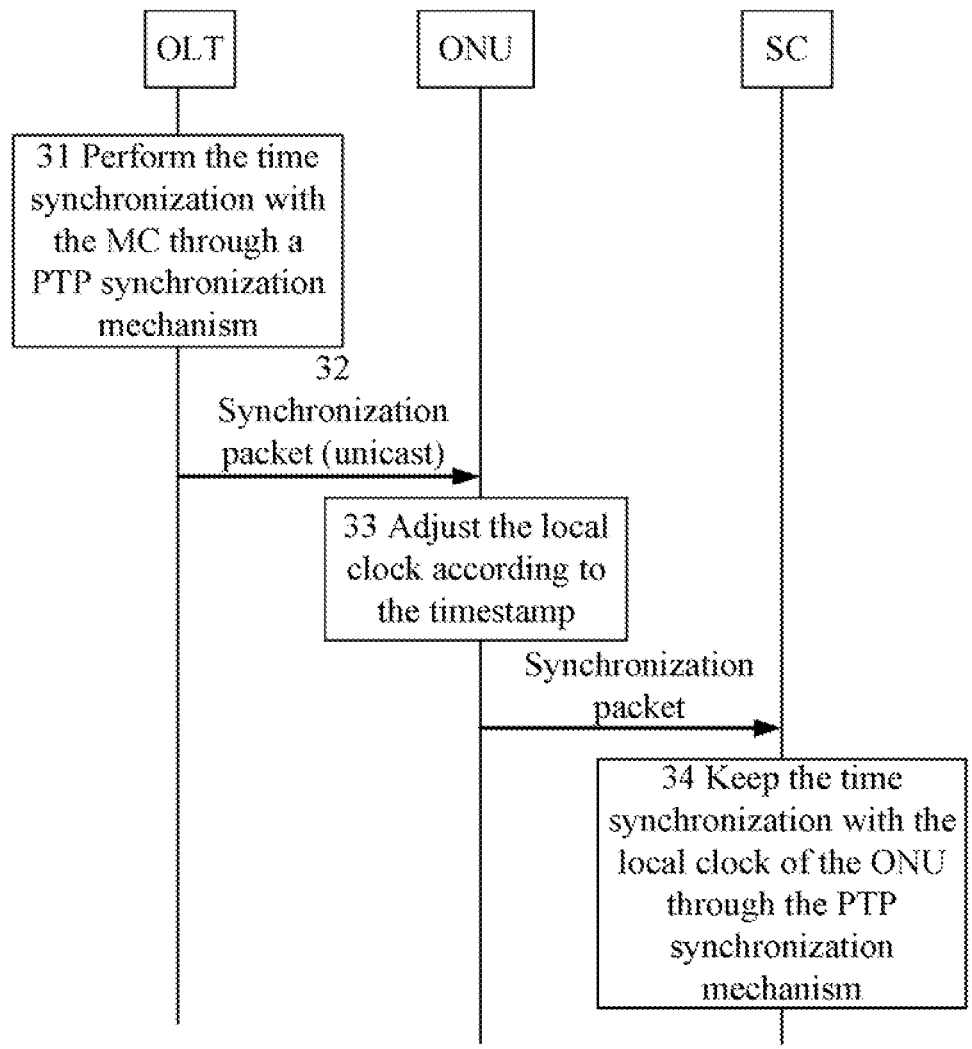
FIG. 3 is a flow chart of a time synchronization method in a PON according to a second embodiment of the present disclosure.

The method provided in the second embodiment is as shown in FIG. 3, which includes the following steps.

In Step 31, the time synchronization of the OLT with the MC (not shown in FIG. 3) is performed through the PTP synchronization mechanism.

In Step 32, the OLT sends the synchronization packet (unicast) to the ONU/ONT. The synchronization packet carries the timestamp TMt1$i$.

In this step, the method for calculating the TMt1$i$ is illustrated in the above, and will not be described again here.

In this step, the specific structure of the synchronization packet is as described in Table 1 above.

In Step 33, the ONU/ONT adjusts the local clock according to the timestamp.

As in this embodiment TMt1$i$=TMt1+Tdi, the method for adjusting the local clock may be any one of Method A or Method B in the first embodiment.

In Step 34, the time synchronization of the SC with the local clock of the ONU/ONT is achieved through the PTP synchronization mechanism.

In the method provided in the second embodiment, the ONU/ONT receives the synchronization packet (unicast) sent by the OLT. The local clock is adjusted through Method A or Method B in the first embodiment to achieve the time synchronization of the ONU/ONT with the OLT. After the time synchronization with the OLT is achieved, the time synchronization of the SC with the local clock of the ONU/ONT is achieved through the PTP synchronization mechanism. Therefore, in the case that the delay from the MC to the SC and the delay from the SC to the MC are different, the time synchronization between the MC and the SC is achieved, thereby satisfying the demand for time synchronization in the PON. As the calculation of TMt1$i$ in this embodiment is performed in the OLT, the calculation amount of the ONU/ONT is reduced and the ONU/ONT equipment is simplified. As the number of the OLTs in the system is far smaller than the number of the ONU/ONTs, the construction cost of the system is reduced.

In a third embodiment, a time synchronization method in a PON is provided. A technical scenario in this embodiment is that the PON is the GPON. A synchronization packet is a multicast synchronization packet. The synchronization packet carries a timestamp TMt1$i$=TMt1. Of course, in actual situations, the synchronization packet may also be a broadcast or unicast synchronization packet. When the synchronization packet is the unicast synchronization packet, a structure of the synchronization packet is as shown in Table 1. When the synchronization packet is the multicast or broadcast synchronization packet, a structure of the synchronization packet is as shown in Table 2.

TABLE 2

| Ocet | Content | Description |
|---|---|---|
| 1 | 0 | Adress to one all ONU |
| 2 | Message-ID | Message ID, identify SYC PLOAM |
| ... | | |
| i | sssssss | MSB of seconds, original timestamp |
| i + 1 | sssssss | LSB of seconds, original timestamp |
| i + 2 | nnnnnnnn | MSB of nanoseconds, original timestamp |
| i + 3 | nnnnnnnn | |
| i + 4 | nnnnnnnn | |
| i + 5 | nnnnnnnn | LSB of nanoseconds, original timestamp |
| ... | rrrrrrrr | reserved |
| 12 | rrrrrrrr | reserved |

A difference between Table 2 and Table 1 is that an ONU-ID value is a specific value used to identify that the message/packet is sent to all ONU/ONTs. If the specific value in Table 2 is "0", the value may also be set according to actual demands, as long as the value is not the same as that in the unicast mode. Table 2 is only an exemplary implementation of this embodiment. In actual situations, other structures may also exist. For example, only "second" fields are included or more time unit fields are included, and the length of each field may be randomly specified according to practical demands. For example, all the 6 fields are "second" fields, or have formats similar to a GPON OMCI packet.

The methods in the third embodiment and in the second embodiment are only different in specific methods for implementing Step 33. In the third embodiment, as TMt1$i$=TMt1, the local clock is adjusted through any one of Method C and Method D in the first embodiment. The other steps are the same as those in the second embodiment, which are not described again here.

In the method provided in the third embodiment, the ONU/ONT receives a synchronization packet (multicast) sent by the OLT. The local clock is adjusted through Method C or Method D in the first embodiment to achieve the time synchronization of the ONU/ONT with the OLT. After the time synchronization with the OLT is achieved, the time synchronization of the SC with the local clock of the ONU is achieved through the PTP synchronization mechanism. Therefore, in the case that the delay from the MC to the SC and the delay from the SC to the MC are different, the time synchronization of the MC with the SC is achieved, thereby satisfying the demand of time synchronization in the PON.

Figure 4:
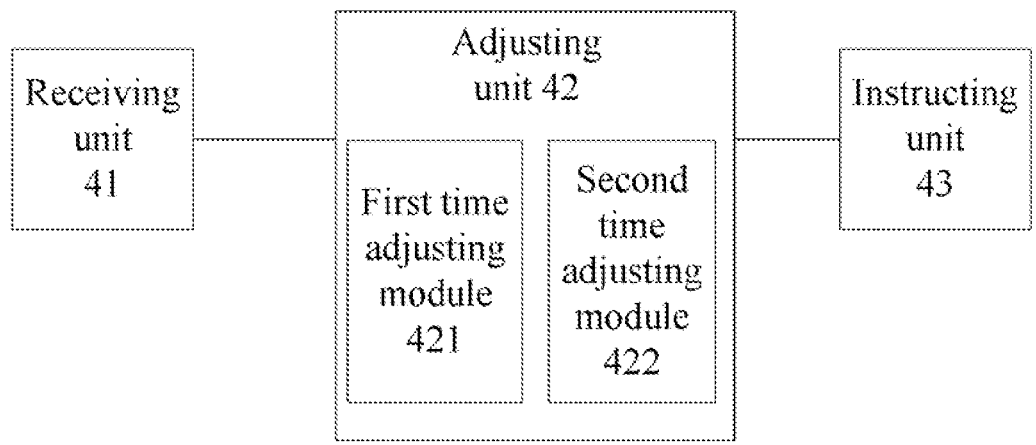
FIG. 4 is a structural view of a time synchronization device in a PON according to an embodiment of the present disclosure.

In an embodiment, the present disclosure further provides a time synchronization device in a PON. As shown in FIG. 4, the device includes a receiving unit 41, an adjusting unit 42, and an instructing unit 43. The receiving unit 41 is configured to receive a synchronization packet sent after time synchronization between an OLT and an MC is achieved, in which the synchronization packet carries a timestamp TMt1$i$. The adjusting unit 42 is configured to adjust a local clock according to the timestamp in the synchronization packet received by the receiving unit 41. The instructing unit 43 is configured to instruct the SC to perform time synchronization after the adjusting unit 42 completes the adjustment of the local clock.

In the device, the adjusting unit 42 includes a first time adjusting unit 421 and a second time adjusting unit 422.

The first time adjusting unit 421 is configured to adjust the local clock to TMt1$i$ or TMt1$i$+Tpi when TMt1$i$=TMt1+Tdi in the synchronization packet received by the receiving unit 41, in which TMt1 is the time of sending the synchronization packet, Tdi is a downlink delay from the OLT to the $i^{th}$ ONU/ONT, and Tpi is a processing delay of processing the synchronization packet.

The second time adjusting unit 422 is configured to adjust the local clock to TMt1+(Tlr−Teqdi)/2 or TMt1+(Tlr−Teqdi)/2+Tpi when TMt1$i$=TMt1 in the synchronization packet received by the receiving unit 41, in which Tpi indicates the time for which the ONU/ONT processes the synchronization packet, (Tlr−Teqdi)/2 indicates a downlink delay from the OLT to the ONU/ONT (for example, the $i^{th}$ ONU/ONT), that is, Tdi=(Tlr−Teqdi)/2. When the PON is a GPON system, the ONU/ONT may obtain Tdi through Tdi=(Tlr−Teqdi)/2, in which Tlr is a system logic loop delay, and Teqdi is a compensation delay.

The instructing unit 43 of the device may also be configured to instruct the SC to achieve the time synchronization with the local clock through a PTP synchronization mechanism. In the device provided in this embodiment, the receiving unit 41 receives the synchronization packet sent by the OLT. The adjusting unit 42 adjusts the local clock according to the timestamp in the synchronization packet, so as to achieve the time synchronization of the ONU/ONT with the OLT. After the time synchronization with the OLT is achieved, the instructing unit 43 instructs the SC to achieve the time synchronization with the local clock through the PTP synchronization mechanism. Therefore, in the case that a delay from the MC to the SC and a delay from the SC to the MC are different, the time synchronization between the MC and the SC is achieved, thereby satisfying the demand of the time synchronization in the PON.

Figure 5:
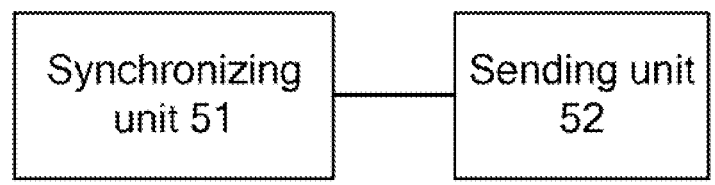
FIG. 5 is a structural view of an OLT according to an embodiment of the present disclosure.

In an embodiment, the present disclosure further provides an OLT. As shown in FIG. 5, the OLT includes a synchronizing unit 51 and a sending unit 52. The synchronizing unit 51 is configured to achieve time synchronization with an MC. The sending unit 52 is configured to send a synchronization packet after the synchronizing unit 51 completes the time synchronization, in which the synchronization packet carries a timestamp TMt1$i$.

In the OLT provided in the specific embodiment of the present disclosure, after the time synchronization of the synchronizing unit 51 with the MC is achieved, the sending unit 52 sends a synchronization packet carrying the timestamp TMt1$i$, so as to support the method and device to achieve the time synchronization between the MC and an SC in the case that a delay from the MC to the SC and a delay from the SC to the MC are different, thereby satisfying the demand of time synchronization in the PON.

Figure 6:
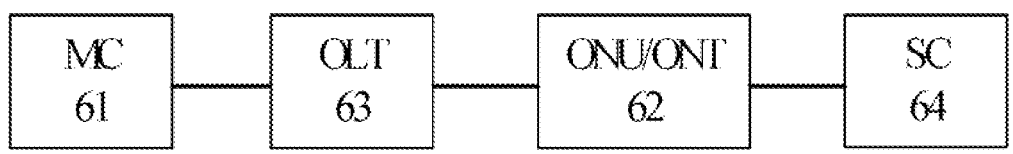
FIG. 6 is a structural view of a time synchronization system in a PON according to an embodiment of the present disclosure.

In an embodiment, the present disclosure further provides a time synchronization system in a PON. As shown in FIG. 6, the system includes an MC 61, an ONU/ONT 62, an OLT 63, and an SC 64.

The OLT 63 is configured to achieve time synchronization with the MC and send a synchronization packet after the time synchronization is completed, in which the synchronization packet carries a timestamp TMt1$i$. The ONU/ONT 63 is configured to receive the synchronization packet, adjust a local clock according to the timestamp TMt1$i$, and instruct the SC to perform time synchronization after the time synchronization with the OLT is achieved.

In another embodiment (not shown) of the present disclosure, the MC 61 may be set on the OLT 63, and the SC 64 may be set on the ONU/ONT 62.

In a system provided in the embodiment of the present disclosure, after the time synchronization of the OLT 63 with the MC 61 is achieved, a synchronization packet carrying a timestamp TMt1$i$ is sent. After the ONU/ONT 63 receives the synchronization packet, the local clock is adjusted according to the timestamp in the synchronization packet and the SC is instructed to perform time synchronization. Therefore, in the case that a delay from an MC to an SC and a delay from the SC to the MC are different, the time synchronization between the MC and the SC is achieved, thereby satisfying the demand of time synchronization in PON.

In a fourth embodiment, a time synchronization method in a PON is provided. A technical scenario in this embodiment is a GPON, and the synchronization packet is a unicast packet or a multicast/broadcast packet. In consideration of factors such as bandwidth utilization efficiency, the multicast/broadcast packet may be used preferentially. The synchronization packet carries a timestamp TMt1$i$=TMt1 indicating the sending time (an accurate time) of a previous downlink frame. When the synchronization packet is a unicast packet, the synchronization packet is as shown in Table 3. The synchronization packet in the form of Table 3 includes a terminal identity ONU-ID and a message identity Message-ID. The ONU-ID is used to identify each destination ONU/ONT. The Message-ID is used to identify that the message is a SYNC PLOAM message. When the synchronization packet is a multicast/broadcast packet, the synchronization packet is as shown in Table 4. Table 4 has a form substantially the same as Table 3. The difference lies in that the ONU-ID field is a predetermined value, indicating that the message is provided for all ONU/ONTs.

TABLE 3

| Ocet | Content | Description |
|---|---|---|
| Ocet | Content | Description |
| 1 | ONU-ID | Adress to one ONU |
| 2 | Message-ID | Message ID, identify SYNC PLOAM |
| ... | | |
| i | SSSSSSSS | MSB of senconds, timestamp of previous downstream ploam |
| i + 1 | SSSSSSSS | |
| i + 2 | SSSSSSSS | |
| i + 3 | SSSSSSSS | LSB of seconds, timestamp of previous downstream ploam |
| ... | rrrrrrrr | Reserved |
| 12 | rrrrrrrr | Reserved |

TABLE 4

| Ocet | Content | Description |
|---|---|---|
| 1 | 0 | Adress to all ONU |
| 2 | Message-ID | Message ID, identify SYNC PLOAM |
| ... | | |
| i | SSSSSSSS | MSB of senconds, timestamp of previous downstream ploam |
| i + 1 | SSSSSSSS | |
| i + 2 | SSSSSSSS | |
| i + 3 | SSSSSSSS | LSB of seconds, timestamp of previous downstream ploam |
| ... | rrrrrrrr | Reserved |
| 12 | rrrrrrrr | Reserved |

Structures of the synchronization packets in Table 3 and Table 4 are both exemplary implementations of the present disclosure. In actual situations, other forms may also exist. For example, more time unit Fields are included. In addition, the synchronization packets in Table 3 and Table 4 may also use a format similar to a GPON OMCI packet.

Figure 7A:
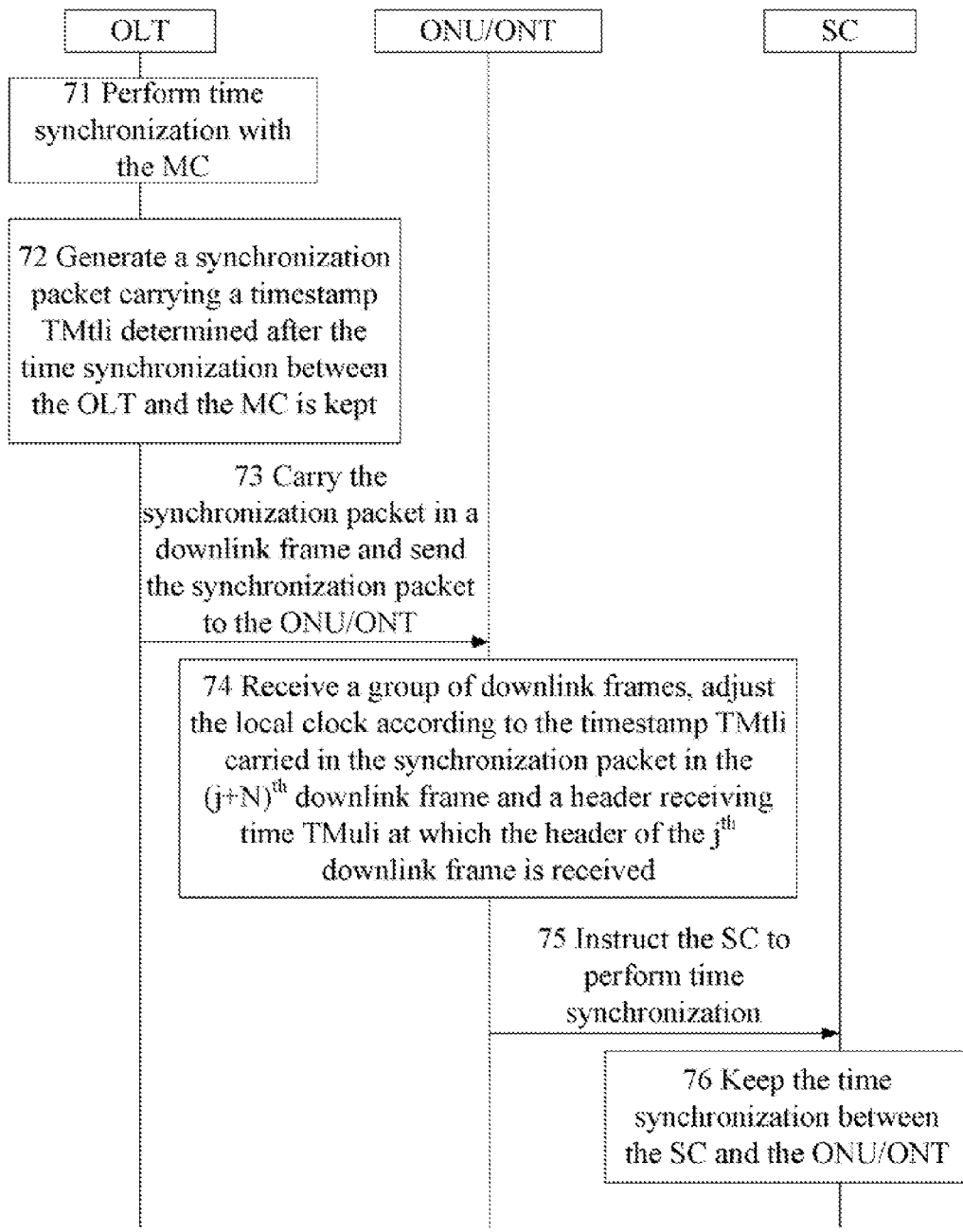
FIG. 7A is a schematic view of a time synchronization method in a PON according to a fourth embodiment of the present disclosure.

As shown in FIG. 7, the method provided in the fourth embodiment includes the following steps.

In Step 71, the time synchronization of the OLT with the MC is performed.

The time synchronization of the OLT with the MC may be achieved through a PTP synchronization mechanism. A specific method of the PTP synchronization mechanism is described in the IEEE 1588 protocol.

The OLT may also be synchronized with the MC through a time synchronization circuit thereof by an external clock source as the MC, for example, a BITS or GPS clock source directly connected to the OLT.

In Step 72, the synchronization packet is generated. The synchronization packet carries a timestamp TMt1$i$ determined after the time synchronization of the OLT with the MC is achieved. The OLT obtains the time of the OLT when a header of the $j^{th}$ downlink frame is sent, that is, a header sending time of the $j^{th}$ downlink frame. The OLT generates a synchronization packet by using the header sending time of the $j^{th}$ downlink frame or the time calculated according to the header sending time of the $j^{th}$ downlink frame and the delay parameter of the PON as the timestamp TMt1$i$.

The method for calculating the timestamp TMt1$i$ has been described in the above, and will not be described again here. It should be noted that Tc at this time is a non-zero value set dynamically or statically. The specific method for selecting the value is illustrated in detail in the following.

The synchronization packet may be a unicast packet, a multicast packet, or a broadcast packet.

The specific structure of the synchronization packet is as shown in Table 3 or Table 4. In actual implementations, the structures of the synchronization packet in Table 1 or Table 2 may also be used.

In Step 73, the OLT carries the synchronization packet in a downlink frame and sends the synchronization packet to the ONU/ONT. The synchronization packet carrying the timestamp TMt1$i$ corresponding to the $j^{th}$ downlink frame is carried in the $(j+N)^{th}$ downlink frame and sent to the ONU/ONT. The timestamp TMt1$i$ indicates the header sending time of the $j^{th}$ downlink frame or the time calculated according to the $j^{th}$ downlink frame and the delay parameter of the PON. Here, N is an integer greater than or equal to 1. At this time. Tc is 0. Alternatively, the synchronization packet carrying the timestamp TMt1$i$ corresponding to the $j^{th}$ downlink frame is carried in the $(j-N)^{th}$ downlink frame and sent to the ONU/ONT. The timestamp TMt1$i$ indicates the header sending time of the $j^{th}$ downlink frame or the time calculated according to the $j^{th}$ downlink frame and the delay parameter of the PON. Here, N is an integer greater than or equal to 1. At this time, the Tc=125 μs*N, in which 125 μs is a frame period of the GPON.

A sending frequency of the synchronization packet (a sending time interval or a frame interval or a length interval of two adjacent synchronization packets) is configurable. The sending frequency of the synchronization packet may be configured in the OLT by an element management system or may also be solidified on a chip before delivery. The method for configuring the sending frequency of the synchronization packet is not covered by the scope of the present disclosure, and will not be described here.

In Step 74, the ONU/ONT receives a group of downlink frames. A time offset between an OLT clock and an ONU/ONT clock is calculated according to the timestamp TMt1$i$ carried in the synchronization packet in the $(j+N)^{th}$ or the $(j-N)^{th}$ downlink frame. The time offset is used to adjust the local time to achieve the time synchronization between the ONU/ONT and the OLT.

A time offset between the OLT clock and the ONU/ONT clock is calculated according to a header receiving time $TMu1i$ of the $j^{th}$ downlink frame, a header sending time of the $j^{th}$ downlink frame $TMt1i$, and a downlink delay $Tdi$ from the OLT to the ONU/ONT, that is, Offset=$TMt1i+Tdi-TMu1i$. The header receiving time $TMu1i$ of the $j^{th}$ downlink frame may be obtained by detecting and receiving the downlink frame before calculating the time offset between the OLT clock and the ONU/ONT clock. Alternatively, a receiving time of the synchronization packet may be obtained by detecting the synchronization packet in the downlink frame. The header receiving time $TMu1i$ of the $j^{th}$ downlink frame is calculated according to the receiving time of the synchronization packet and the timestamp $TMt1i$ carried in the synchronization packet.

The ONU/ONT may record the header receiving time $TMu1i$ of one or more downlink frames according to configurations. For example, the header receiving time of each downlink frame may be recorded. Also, the header receiving time of specific downlink frames may be recorded according to the demands.

The ONU/ONT may be synchronized with the synchronization packet of the OLT through the following steps.

In Step 74-1, the ONU/ONT receives the downlink frame of the OLT and enters a HUNT status.

In Step 74-2, the ONU/ONT receives the synchronization packet of the OLT and enters a SYNC status.

In Step 74-3, the ONU/ONT detects whether the synchronization packet is received again after the $N^{th}$ frame according to configurations, and processes a detection result according to configurations or system requirements.

The ONU/ONT may enter the HUNT status when the ONU/ONT still cannot detect the synchronization packet after continuous m×N frames.

The ONU/ONT may be always in the SYNC status regardless whether the synchronization packet is periodically detected, until the system instructs the ONU/ONT to return to the HUNT status again through a configuration channel.

The ONU/ONT may also be always in the SYNC status until the ONU/ONT is reset externally. The method can use a conventional external reset method, which will not be described here.

In the following, it is assumed that ONU/ONT performs $k^{th}$ time adjustment, where k is an integer greater than or equal to 1.

The ONU/ONT may calculate a $k^{th}$ time offset between the OLT clock and the ONU/ONT clock according to the timestamp $TMt1i$ included in the synchronization packet in the $(j+N)^{th}$ or the $(j-N)^{th}$ downlink frame and the header receiving time $TMu1i$ of the $j^{th}$ downlink frame, and adjust the local clock according to the $k^{th}$ time offset.

Each time offset is calculated through the following formula:

Offset=$TMt1i+Tdi-TMu1i$, in which $Tdi=(Tlr-Teqdi)/2$.

The adjustment of the local clock according to the $k^{th}$ time offset is performed through the following formula: $TMu2i=TMu2i+$Offset, in which $TMu2i$ on the right of the formula is a local time of the ONU/ONT at the adjustment moment, and $TMu2i$ on the left of the formula indicates an accurate time after the adjustment.

Figure 7B:
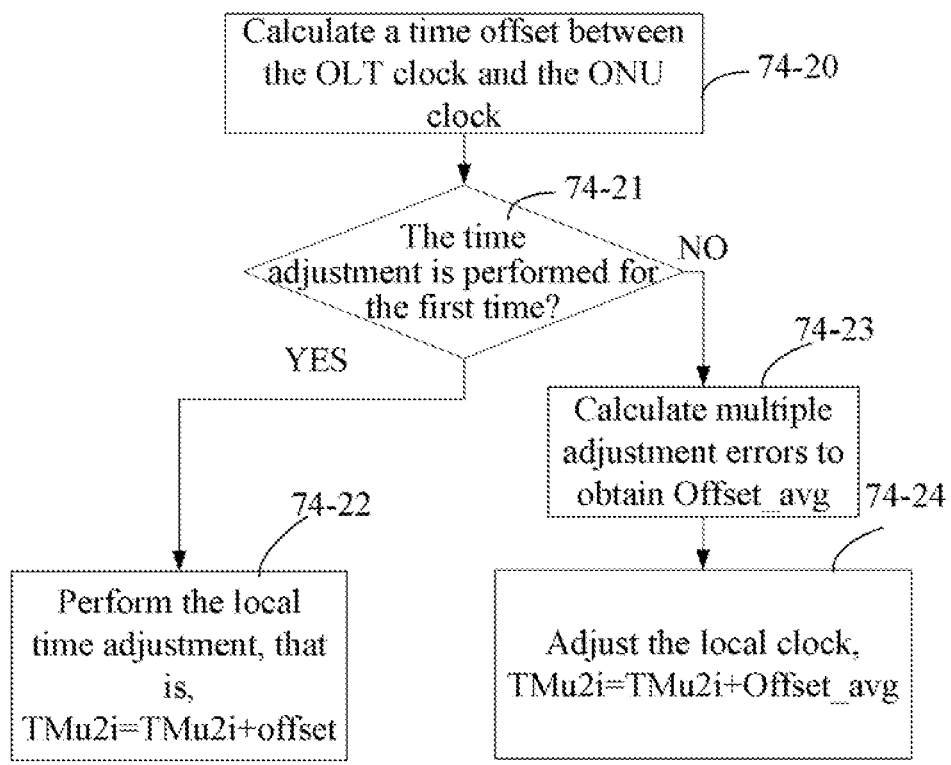
FIG. 7B is a schematic view of adjustment of the local time by an ONU/ONT according to the fourth embodiment of the present disclosure.

In another embodiment of the present disclosure, the ONU/ONT may also adjust the local time according to configured policies or rules. If k=1, the $k^{th}$ time offset may be directly used to adjust the local clock. If k>1, a calibrated time offset is obtained according to the statistics of the $k^{th}$ time offset and one or more of the first to $k^{th}$ time offsets, and the calibrated time offset is then used to adjust the local clock. The calibrated time offset may reduce errors and improve the accuracy. Steps 74-20 to 74-24 in FIG. 7B are an example of obtaining a calibrated time offset through statistics.

In Step 74-20, a time offset ($k^{th}$) between the OLT clock and the ONU/ONT clock is calculated.

In Step 74-21, it is determined whether the time adjustment of the ONU/ONT is performed for the first time.

In Step 74-22, if the time adjustment of the ONU/ONT is the first time, the first time offset is used to perform the local time adjustment, that is, $TMu2i=TMu2i+$offset.

In Step 74-23, if the time adjustment of the ONU/ONT is not the first time, statistics are taken on several time offsets to obtain a statistical value to calibrate the time offsets. That is, statistics are taken on the $k^{th}$ time offset and one or more of the first to $k^{th}$ time offsets to obtain the statistical value. The statistical value is a calibrated time offset.

The statistics mode may be based on an average value or a mean square value of several time offsets. For example, the ONU/ONT calculates an average value Offset_avg of k offsets (k is an integer greater than 1).

In Step 74-24, the statistical value of several time offsets, for example, the Offset_avg, is used to adjust the local time: $TMu2i=TMu2i+$Offset_avg.

Steps 74-20 to 74-24 are an example of adjusting the ONU/ONT local clock according to policies provided in the embodiment of the present disclosure. The execution steps of the method may be adjusted as required. For example, it is determined whether the time adjustment is the first time first, and then the time offset is calculated according to the determination result.

In Step 75, the SC of the ONU/ONT is instructed to perform time synchronization.

In Step 76, the time synchronization of the local clocks of the SC with the ONU/ONT is achieved.

The ONU/ONT may perform the time synchronization through a PTP mechanism. Alternatively, SC equipment connected to the ONU/ONT may be instructed to perform the time synchronization. Alternatively, the equipment that needs time synchronization connected to the ONU/ONT is notified that the time is already synchronized.

In the method provided in the fourth embodiment, in the case that the delay from the MC to the SC and the delay from the SC to the MC are different, the time synchronization between the MC and the SC is achieved, thereby satisfying the demand of the time synchronization.

In a fifth embodiment, a time synchronization method in a PON is provided. In this embodiment, a technical scenario is that the PON in this embodiment is a GPON and a synchronization packet is a unicast or multicast/broadcast synchronization packet. The synchronization packet carries a timestamp $TMt1i=TMt1$ and a frame sequence number Fsn=Superframe_counter$_{j-1}$ or Fsn=superframe_counter$_{ii}$ (j is an integer greater than 1, and 1 is an integer greater than 1). That is, the synchronous timestamp $TMt1i$ corresponding to the $j^{th}$ downlink frame is carried in the $(j+1)^{th}$ downlink frame or the $(j-1)^{th}$ downlink frame. The timestamp $TMt1i$ indicates a frame header sending time of a downlink frame with a sequence number Fsn. The definition of Superframe_counter is described in related chapters in ITU G984.3.

The method in the fifth embodiment and the method in the fourth embodiment are different only in that a frame sequence number Fsn is added in a synchronization packet (unicast or a multicast or broadcast) at an OLT end. At the ONU/ONT end, the frame sequence number Fsn in the synchronization packet needs to be processed correspondingly. Other steps of the method according to the fifth embodiment are same as those in the fourth embodiment, and will not be described again here. The calculation of the timestamp TMt1$i$ and the Fsn in the synchronization packet is illustrated in the above, and will not be described again here.

A sending frequency of the synchronization packet is as described in the fourth embodiment, and will not be described again here.

The step that the ONU/ONT end processes the frame sequence number Fsn in the synchronization packet is further described in the following. This step may be performed through Method E, F, G or H.

Method E includes the following steps.

In Step 74-E1, a group of downlink frames is received. A header receiving time TMu1$i$ of each downlink frame is recorded. A corresponding relation between a frame sequence number Fsnr1 identifying each downlink frame and a header receiving time TMu1$i$ is extracted and recorded. The corresponding relation between the header receiving time TMu1$i$ and the frame sequence number Fsnr1 of each downlink frame may be stored in a table as an entry.

In Step 74-E2, a synchronization packet carrying the timestamp TMt1$i$ and the frame sequence number Fsn is received.

In Step 74-E3, a header receiving time TMu1$i$ (that is, the TMu1$i$ when Fsnr1=Fsn) corresponding to the frame sequence number Fsn is searched in the record according to the Fsn in the synchronization packet.

In Step 74-E4, the TMt1$i$ and the TMu1$i$ are output.

Method F includes the following steps.

In Step 74-F1, a group of downlink frames is received. A header receiving time TMu1$i$ of a specific downlink frame is recorded according to configurations. A frame sequence number Fsnr1 of a corresponding downlink frame is extracted and recorded. Here, the specific downlink frame refers to a downlink frame that needs to be recorded.

In Step 74-F2, a synchronization packet in a certain downlink frame following the specific downlink frame is received. A timestamp TMt1$i$ and a frame sequence number Fsn carried in the synchronization packet are extracted.

In Step 74-F3, a header receiving time TMu1$i$ of the downlink frame with the frame sequence number Fsn, that is, TMu1$i$ when Fsnr1=Fsn, is searched in the record according to the Fsn.

In Step 74-F4, the TMt1$i$ and the TMu1$i$ are output.

Method G includes the following steps.

In Step 74-G1, a downlink frame is received, and a frame sequence number Fsnr1 identifying the downlink frame is recorded.

In Step 74-G2, a synchronization packet in the downlink frame is received, a timestamp TMt1$i$ and an Fsn carried in the synchronization packet are extracted, and the time TMu3$i$ at which the synchronization packet is received is recorded.

In Step 74-G3, the header receiving time TMu1$i$ of the downlink frame with the frame sequence number Fsn is calculated according to the frame sequence number Fsnr1 identifying the downlink frame, the frame sequence number Fsn carried in the synchronization packet in the downlink frame, and the time TMu3$i$ at which the synchronization packet is received.

In Step 74-G4, the TMt1$i$ and the TMu1$i$ are output.

The header receiving time TMu1$i$ of the downlink frame with the frame sequence number Fsn may be calculated through the following method:

$$TMu1i = TMu3i - (Fsnr1 - Fsn)*125 \mu s - \text{Offset}_{synpacket}*T_{bit}$$

where Offset$_{synpacket}$ is an offset of the synchronization packet in the downlink frame, in a unit of bit; $T_{bit}$ is the time of one bit in the downlink frame, and for a GPON downlink frame with a downlink rate of 2.488 Gbit/s, $T_{bit}$ is ½.488 ns, which is about 0.4 ns.

Method H includes the following steps.

In Step 74-H1, a downlink frame is received, and the header receiving time TMu3$i$ and the frame sequence number Fsnr1 of the downlink frame are recorded.

In Step 74-H2, the synchronization packet in the downlink frame is received and the timestamp TMt1$i$ and the frame sequence number Fsn carried in the synchronization packet are extracted.

In Step 74-H3, the header receiving time TMu1$i$ of the downlink frame with the frame sequence number Fsn is calculated according to the header receiving time TMu3$i$ and the frame sequence number Fsnr1 of the downlink frame, and the frame sequence number Fsn carried in the synchronization packet in the downlink frame.

In Step 74-H4, the timestamps TMt1$i$ and TMu1$i$ are output.

Taking a GPON system as an example, in this step, the header receiving time TMu1$i$ of the downlink frame having the frame sequence number Fsn may be calculated through the following method:

$$TMu1i = TMu3i - (Fsnr1 - Fsn)*125$$

where 125 μs is a frame period of the GPON.

In Methods G and H. TMu1$i$ may be calculated at the time according to configurations. That is. TMu1$i$ may be calculated when the synchronization packet is received or when clock adjustment is needed according to the configurations. It is assumed that the time when the clock needs to be adjusted is indicated by local time TMu4$i$. At this time, a sequence number of the corresponding downlink frame is Fsnui, and an offset between the time and the corresponding downlink frame is Offset_syn, and TMu1$i$ may be calculated through the following formula:

$$TMu1i = TMu4i - (Fsnui - Fsn)*125 \mu s - \text{Offset\_syn}*T_{bit}$$

Methods G and H provided in the fifth embodiment can decrease the dependence of the sending time of the synchronization packet on a strict time sequence, thereby simplifying the requirement for time synchronization in the PON.

Figure 8:
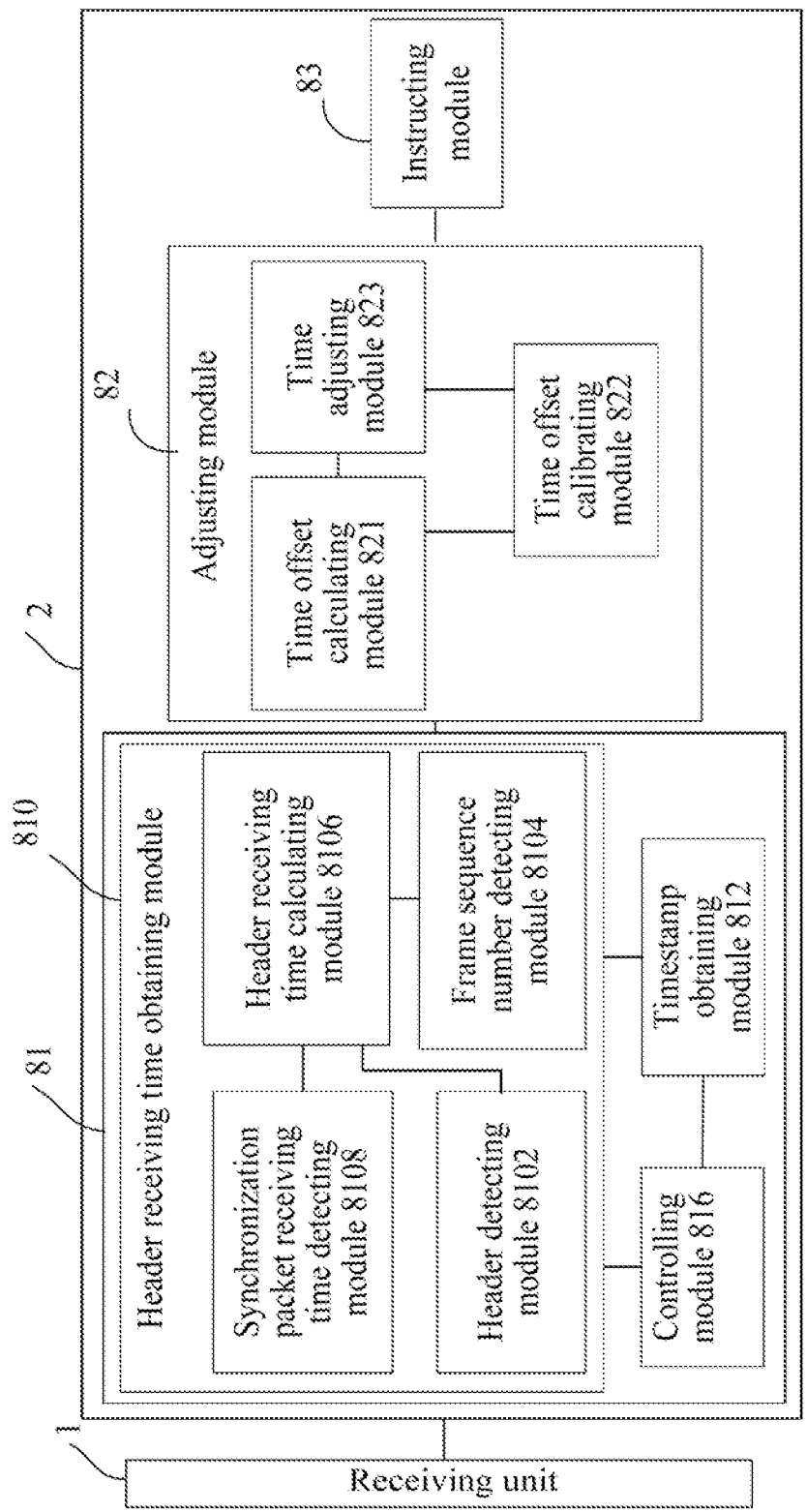
FIG. 8 is a structural view of a time synchronization device according to an embodiment of the present disclosure.

In an embodiment, the present disclosure further provides a time synchronization device 2 in a PON. The device may be disposed in ONT equipment such as an ONU/ONT. The time synchronization device 2 is coupled to an SC. After the time synchronization of the SC with an MC of an OLT is achieved, a timestamp TMt1$i$ carried in a synchronization packet is parsed from a packet received by a receiving unit to adjust the SC. As shown in FIG. 8, the device includes a time obtaining unit 81, an adjusting module 82, and an instructing module 83.

The time obtaining unit 81 is configured to detect one or a plurality of downlink frames received in a downlink reception process and obtain a header receiving time of downlink frame according to a detection result. The time obtaining unit 81 further extracts the timestamp TMt1$i$ carried in a synchronization packet in a (j+N)$^{th}$ or (j−N)$^{th}$ downlink frame. Here, both the j and N are integers greater than or equal to 1. The timestamp TMt1$i$ indicates OLT time when the OLT sends the j$^{th}$ downlink frame, or a sum of the header sending time of the j$^{th}$ downlink frame and a downlink delay from the OLT to the ONU/ONT (ith).

The adjusting module 82 is configured to adjust a local clock according to the header receiving time of the $j^{th}$ downlink frame obtained by the time obtaining unit 81 and the timestamp TMt1$i$ carried in the synchronization packet in the $(j+N)^{th}$ or $(j-N)^{th}$ downlink frame so as to achieve time synchronization between an OLT clock and an ONU/ONT clock.

The instructing module 83 is configured to instruct the SC to achieve synchronization with the local clock after the adjusting module 82 adjusts the local clock, for example, to instruct the SC to achieve synchronization with the local clock through the PTP synchronization mechanism. The instructing module 83 may determine whether to achieve time synchronization with the OLT according to a synchronization status of the ONU/ONT.

The time obtaining unit 81 includes a timestamp obtaining module 812 and a header receiving time obtaining module 810. The timestamp obtaining module 812 is configured to detect a downlink frame and extract a timestamp TMt1$i$ from a synchronization packet in the downlink frame. The header receiving time obtaining module 810 is configured to detect the downlink frame, and obtain a header receiving time of the downlink frame according to a detection result, in which the obtained header receiving time includes a header receiving time of the $j^{th}$ downlink frame. The timestamp obtaining module 812 and the header receiving time obtaining module 810 may operate separately, or operate under the control of a control module 816. In addition, the timestamp obtaining module 812 may further provide the timestamp TMt1$i$ to a header receiving time calculating module 8106 of the header receiving time obtaining module 810 for calculation. The structure of the header receiving time obtaining module 810 is further illustrated in the following with reference to the method.

If Method E is used, the time synchronization device 2 further includes a storage module (not shown). A function of each module of the header receiving time obtaining module 810 may be as follows. A header detecting module 8102 detects and records a header receiving time TMu1$i$ of each downlink frame in a downlink reception process. A frame sequence number detecting module 8104 detects a frame sequence number Fsn in a synchronization packet and a frame sequence number Fsnr1 identifying a downlink frame. The storage module stores a corresponding relation between the frame sequence number Fsnr1 and the header receiving time. The corresponding relation between Fsnr1 and the header receiving time of each downlink frame may be stored in a table as an entry. The header receiving time calculating module 8106 searches for TMu1$i$ when the frame sequence number Fsnr1 equals Fsn (that is, Fsnr1=Fsn) in the storage module according to the Fsn detected by the frame sequence number detecting module 8104.

If Method F is used, the time synchronization device 2 further includes a storage module (not shown). A function of each module in the header receiving time obtaining module 810 may be as follows. The header detecting module 8102 detects and records a header receiving time TMu1$i$ of a specific downlink frame according to configurations. The frame sequence number detecting module 8104 detects a frame sequence number Fsnr1 identifying a downlink frame and a frame sequence number Fsn in the synchronization packet. The storage module stores a corresponding relation between the frame sequence number Fsnr1 and the header receiving time of the downlink frame. The header receiving time calculating module 8106 searches for TMu1$i$ when the frame sequence number Fsnr1 equals Fsn (that is. Fsnr1=Fsn) in the storage module according to the Fsn.

If Method G is used, a function of each module of the header receiving time obtaining module 810 is as follows. The frame sequence number detecting module 8104 detects a frame sequence number Fsnr1 identifying the downlink frame and a frame sequence number Fsn carried in a synchronization packet in the downlink frame. The synchronization packet receiving time detecting module 8108 detects and records a time TMu3$i$ of receiving the synchronization packet. The header receiving time calculating module 8106 calculates a header receiving time TMu1$i$ of the downlink frame having the frame sequence number Fsn according to the frame sequence number Fsnr1 identifying the downlink frame, the frame sequence number Fsn carried in the synchronization packet in the downlink frame, and the TMu3$i$ of receiving the synchronization packet.

If Method H is used, a function of each module of the header receiving time obtaining module 810 is as follows. The frame sequence number detecting module 8104 detects a frame sequence number Fsnr1 identifying the downlink frame and a frame sequence number Fsn carried in a synchronization packet in the downlink frame. The header detecting module 8102 detects and records a header receiving time TMu3$i$ of the downlink frame. The header receiving time calculating module 8106 calculates a header receiving time TMu1$i$ of the downlink frame having the frame sequence number Fsn according to the frame sequence number Fsnr1 identifying the downlink frame, the frame sequence number Fsn carried in the synchronization packet in the downlink frame, and the header receiving time TMu3$i$ of the downlink frame.

The adjusting module 82 may include a time offset calculating module 821, a time offset calibrating module 822, and a time adjusting unit 823.

The time offset calculating module 821 is configured to calculate a time offset between an OLT clock and an ONU/ONT clock according to a header receiving time TMu1$i$ and a timestamp TMt1$i$ of a downlink frame obtained by the time obtaining unit 81.

The time offset calibrating module 822 is coupled to the time offset calculating module 821, and is configured to calibrate the time offset calculated by the time offset calculating module 821. For example, statistics are taken on time offsets obtained through multiple calculations provided by the time offset calculating module 821 to obtain a statistical value, which serves as a calibrated time offset.

The time adjusting unit 823 is configured to adjust a local clock according to the time offset provided by the time offset calculating module 821 or the time offset calibrating module 822. The time adjusting unit 823 may directly use the time offset obtained in the $k^{th}$ calculation to adjust the local clock.

Figure 9:
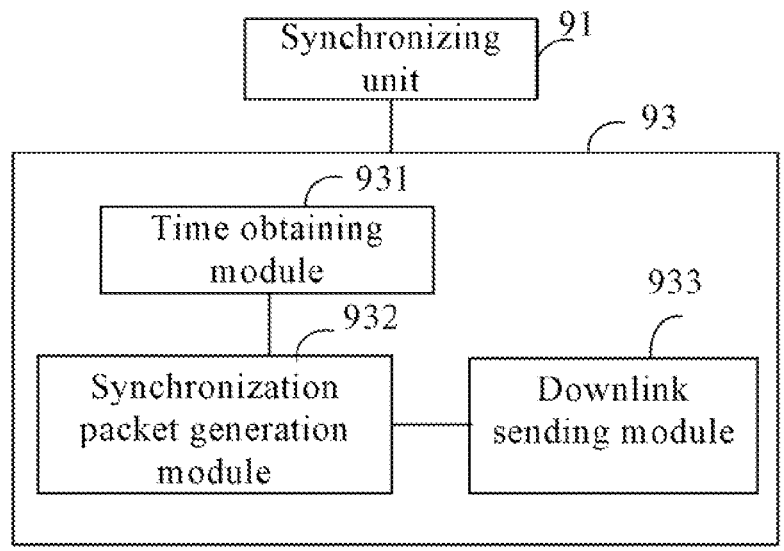
FIG. 9 is a structural view of an OLT according to an embodiment of the present disclosure.

In an embodiment, the present disclosure further provides an OLT. The OLT is as shown in FIG. 9. Time synchronization of the OLT with a clock source is achieved. The clock source may be an external clock source connected to the OLT or a clock source embedded in the OLT. The OLT includes a synchronizing unit 91 and a sending unit 93.

The synchronizing unit 91 is configured to achieve time synchronization with the clock source.

The sending unit 93 is configured to send a synchronization packet to an ONU/ONT after the time synchronization (that is, the time synchronization with the clock source) is achieved, in which the synchronization packet carries a timestamp TMt1$i$ determined after the time synchronization is achieved.

The sending unit 93 includes a time obtaining module 931, a packet generating module 932, and a downlink sending module 933.

The time obtaining module 931 is configured to determine a timestamp TMt1$i$ according to an OLT time in a downlink sending process after the time synchronization is achieved. The OLT time in the downlink sending process includes an OLT time when the OLT sends the synchronization packet, or an OLT time when the OLT sends a header of the $j^{th}$ downlink frame, or an OLT time when the OLT sends a header of a $(j+N)^{th}$ or $(j-N)^{th}$ downlink frame carrying the synchronization packet. The $(j+N)^{th}$ or $(j-N)^{th}$ downlink frame is sent before or after the $j^{th}$ downlink frame. Here, both j and N are integers greater than or equal to 1.

The packet generating module 932 is configured to generate a synchronization packet based on a PON control and/or management protocol. The synchronization packet carries the timestamp TMt1$i$, and the synchronization packet is sent to the ONU/ONT through the sending unit.

The downlink sending module 933 is configured to send the synchronization packet carrying the timestamp TMt1$i$ generated by the packet generating module 932 to the ONU/ONT through an optical transmission channel.

The PON control and/or management protocol includes a PON OAM protocol, for example, a GPON OMCI protocol, a PLOAM protocol, or an EPON MPCP.

The packet generating module 932 may further encapsulate PON delay parameters in a synchronization packet or a delay configuration packet. The PON delay parameters include a downlink delay from an OLT to an ONU/ONT or a loop delay between the OLT and the ONU. For example, for a format in Table 6, a synchronization packet that the OLT needs to send to an $i^{th}$ ONU/ONT has an encapsulated downlink delay from the OLT to the $i^{th}$ ONU/ONT. For a format in Table 7, a synchronization packet that the OLT needs to send to an $i^{th}$ ONU/ONT has an encapsulated loop delay between the OLT and the $i^{th}$ ONU/ONT.

As described above, the timestamp TMt1$i$ determined according to the OLT time in the downlink sending process (the OLT time when the OLT sends the synchronization packet or the header sending time of the downlink frame) may be the OLT time when the OLT sends the synchronization packet, or a sum of the OLT time when the OLT send the synchronization packet and the downlink delay from the OLT to the $i^{th}$ ONU/ONT, or an OLT time when sending a header of the downlink frame (for example, a header sending time of the $j^{th}$ downlink frame or an OLT time of a header of the $(j+N)^{th}$ or the $(j-N)^{th}$ downlink frame), or a sum of the OLT time when the OLT sends the header of the downlink frame and a downlink delay from the OLT to the $i^{th}$ ONU/ONT.

The $(j+N)^{th}$ or the $(j-N)^{th}$ downlink frame may be a control frame including no data, or a data frame carrying data. If the $(j+N)^{th}$ or the $(j-N)^{th}$ downlink frame carries data, the downlink frame includes a header portion and a data payload portion for carrying data. At this time, the synchronization packet is preferably configured at the header portion of the downlink frame.

Figure 10A:
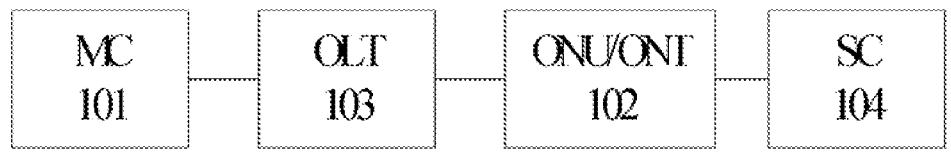
FIGS. 10A and 10B are structural views of a PON according to an embodiment of the present disclosure.
Figure 10B:
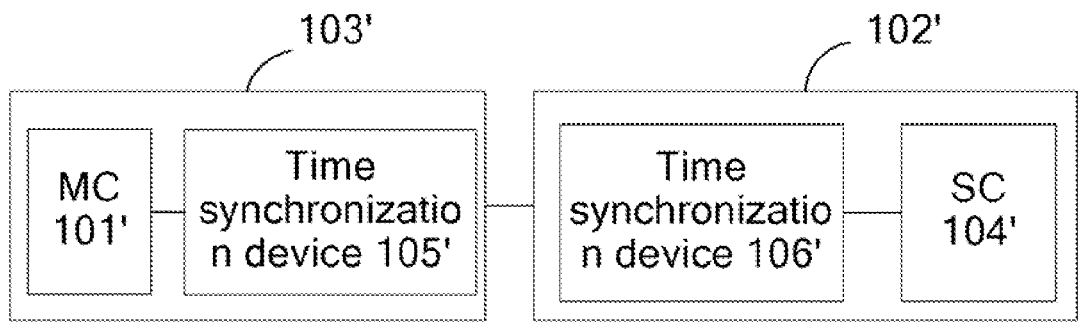

In an embodiment, the present disclosure further provides a PON. The PON is shown in FIGS. 10A and 10B. The PON in FIG. 10A includes an ONU/ONT 102 connected to a clock source as an SC, and an OLT 103 connected to a clock source as an MC.

The OLT 103 is configured to achieve time synchronization with the MC. After the time synchronization is achieved, a $j^{th}$ downlink frame is sent, a header sending time of the $j^{th}$ downlink frame is recorded, or the header sending time of the $j^{th}$ downlink frame is calculated when a $(j-N)^{th}$ downlink frame is sent. A synchronization packet is generated according to the header sending time of the $j^{th}$ downlink frame. In a downlink frame (the $(j+N)^{th}$ or the $(j-N)^{th}$ downlink frame) that the synchronization packet needs to be sent, the synchronization packet is sent. A timestamp TMt1$i$ carried in the synchronization packet may be a header sending time of the $j^{th}$ downlink frame or a time calculated according to the header sending time of the $j^{th}$ downlink frame. Here, j and N are integers greater than or equal to 1.

The ONU/ONT 102 is configured to receive a group of downlink frames. The group of downlink frames includes the $j^{th}$ downlink frame and the $(j+N)^{th}$ downlink frame. A local time is adjusted according to the header receiving time of the $j^{th}$ downlink frame, the header receiving time of one of the $(j+N)^{th}$ or the $(j-N)^{th}$ downlink frame, and a timestamp TMt1$i$ carried in the synchronization packet in the $(j+N)^{th}$ or the $(j-N)^{th}$ downlink frame, such that ONU/ONT 102 achieves the time synchronization with the OLT 103 and the SC is instructed to perform time synchronization after the time synchronization with the OLT 103 is achieved.

In FIG. 10A, the MC is an external clock source connected to the OLT and the SC is an external clock source connected to the ONU/ONT. FIG. 10B is different from FIG. 10A in that an ONU/ONT 102' includes an SC 104' and a time synchronization device 106' and an OLT 103' includes an MC101' and a time synchronization device 105'. The time synchronization device 105' has the same synchronization function as the OLT 103 in FIG. 10A. The time synchronization device 106' has the same synchronization function as the ONU/ONT 102 in FIG. 10A, and will not be described again here.

The PON provided in this embodiment of the present disclosure realizes time synchronization between the MC and the SC in the case that a delay from the MC to the and a delay from the SC to the MC are different, thereby satisfying the demand of time synchronization.

In a sixth embodiment, a time synchronization method in a PON is provided. A technical scenario of the embodiment is that the PON in this embodiment is an EPON and the synchronization packet is a MPCP-based control packet (which is also referred to as an MPCP frame). In this embodiment, the synchronization packet carries a timestamp TMt1$i$=TMt1+ Tdi. The synchronization packet uses a "synchronization MPCP packet" (related packet names are listed in Table 10), which has a structure as shown in Table 5. The synchronization packet may still use the structure of a current EPON MPCP packet. For example, the MPCP synchronization packet shown in Tables 5 to 9 still uses a structure of a GATE MPCP packet. As shown in Tables 5 to 9, a TS/Delay field (1 byte) is added in the GATE packet to indicate whether the MPCP packet carries a timestamp TMt1$i$ and a delay Tdi or RTTi. When the ONU/ONT receives the synchronization MPCP packet, it may be determined whether the packet carries the timestamp TMt1$i$ and/or the delay Tdi or RTTi by occupying values of a Pad field (the field is filled with all zero according to the EPON standard) according to the TS/Delay field, thereby determining whether a synchronization operation is needed. Specific meanings of the TS/Delay field in Tables 5 to 9 are listed in Table 10. Names of corresponding MPCP packets are also listed Table 10. Specific field meanings in Tables 5 to 10 are illustrated in detail in this embodiment and the subsequent embodiments.

TABLE 5

Synchronization MPCP packet

| Field | Value | Length |
|---|---|---|
| DA | XX | 6 |
| SA | XX | 6 |

TABLE 5-continued

Synchronization MPCP packet

| Field | Value | Length |
|---|---|---|
| Length/Type | 88-08 | 2 |
| Opcode | 00-02 | 2 |
| Timestamp | XX | 4 |
| Grant/Flag | 00 | 1 |
| TS/Delay | 02 | 1 |
| TMtli (unit is 1 μs) | XX | 8 |
| Tdi (unit is 16 ns) |  | 0 |
| Pad |  | 30 |
| FCS |  | 4 |

TABLE 6

Synchronization & downlink delay configuration MPCP packet

| Field | Value | Length |
|---|---|---|
| DA | XX | 6 |
| SA | XX | 6 |
| Length/Type | 88-08 | 2 |
| Opcode | 00-02 | 2 |
| Timestamp | XX | 4 |
| Grant/Flag | 00 | 1 |
| TS/Delay | 03 | 1 |
| TMtli (unit is 1 μs) |  | 8 |
| Tdi (unit is 16 ns) | XX | 2 |
| Pad |  | 28 |
| FCS |  | 4 |

TABLE 7

Synchronization & loop delay configuration MPCP packet

| Field | Value | Length |
|---|---|---|
| DA | XX | 6 |
| SA | XX | 6 |
| Length/Type | 88-08 | 2 |
| Opcode | 00-02 | 2 |
| Timestamp | XX | 4 |
| Grant/Flag | 00 | 1 |
| TS/Delay | 13 | 1 |
| TMtli (unit is 1 μs |  | 8 |
| RTTi (unit is 16 ns) | XX | 2 |
| Pad |  | 28 |
| FCS |  | 4 |

TABLE 8

Downlink delay configuration MPCP packet

| Field | Value | Length |
|---|---|---|
| DA | XX | 6 |
| SA | XX | 6 |
| Length/Type | 88-08 | 2 |
| Opcode | 00-02 | 2 |
| Timestamp | XX | 4 |
| Grant/Flag | 00 | 1 |
| TS/Delay | 01 | 1 |
| TMtli (unit is 1 μs |  | 0 |
| Tdi (unit is 16 ns) | XX | 2 |
| Pad |  | 36 |
| FCS |  | 4 |

TABLE 9

Loop delay configuration MPCP packet

| Field | Value | Length |
|---|---|---|
| DA | XX | 6 |
| SA | XX | 6 |
| Length/Type | 88-08 | 2 |
| OpCode | 00-02 | 2 |
| Timestamp | XX | 4 |
| Grant/Flag | 00 | 1 |
| TS/Delay | 11 | 1 |
| TMtli (unit is 1 us) |  | 0 |
| RTTi (unit is 16 ns) | XX | 2 |
| Pad |  | 36 |
| FCS |  | 4 |

TABLE 10

Field definition and packet naming

| TS/Delay Value | Meaning | Name of Corresponding Packet |
|---|---|---|
| 0x00 | No corresponding field |  |
| 0x01 | Only Tdi field | Downlink delay configuration |
| 0x02 | Only TMtli field | Synchronization |
| 0x03 | TMtli field and Tdi field | Synchronization & downlink delay configuration |
| 0x11 | Only RTTi field | Loop delay configuration |
| 0x13 | TMtli field and RTTi field | Synchronization & loop delay configuration |

A structure of the MPCP packet in Table 5 is an exemplary embodiment where no MPCP packet Opcode code is added in the present disclosure. In actual situations, other forms may also be used. For example, the value of the Opcode field of the synchronization packet may be other values, that is, an Opcode is newly defined, for example, 00-0A. In addition, in actual situations, the MPCP packet may also be a packet of other types, that is, the Length/Type is in other values, for example, 88-09 (an EPON OAM packet), or 88-88 (an example, indicating a new definition value, which has no fixed value and may be flexibly defined according to actual situations).

In the sixth embodiment, the synchronization MPCP packet carries a timestamp. That is, the TS/Delay field is set to "02" and the TMt1$i$ field is set to a timestamp field, thus carrying the timestamp TMt1$i$. The method provided in the sixth embodiment may be same as that in the second embodiment, and will not be described again here.

In the method provided in the sixth embodiment, the ONU receives the sent synchronization packet through the OLT and achieves time synchronization with the local clock according to Method A or Method B provided in the first embodiment. After the time synchronization with the OLT is achieved, the time synchronization between an SC and the local clock of the ONU is achieved through a PTP synchronization mechanism. Therefore, in the case that a delay from an MC to the SC and a delay from the SC to the MC are different, the time synchronization between the MC and the SC may be achieved, thereby satisfying the demand for time synchronization.

In a seventh embodiment, a time synchronization method in a PON is provided. The PON in this embodiment is an EPON and the synchronization packet is an MPCP packet including a timestamp TMt1$i$ field and a downlink delay Tdi field for delay configuration, that is, a "synchronization & downlink delay configuration MPCP packet". In this embodiment, the timestamp TMt1$i$ field in the MPCP packet for delay configuration carries a timestamp TMt1$i$=TMt1, and the downlink delay Tdi field carries a downlink delay Tdi from the OLT to the ONU/ONT. The timestamp TMt1$i$ indicates an OLT time when the OLT sends the "synchronization & downlink delay configuration MPCP packet". The structure of the "synchronization & downlink delay configuration MPCP packet" is as shown in Table 6.

The methods in the seventh embodiment and in the second embodiment are different only in the specific method of Step 33. In the seventh embodiment, as TMt1$i$=TMt1 and at the same time the downlink delay Tdi is carried, any one of Method C and Method D in the first embodiment can be used to adjust the local clock. However, the used time and delay information only need to be extracted from the synchronization packet. Other steps are the same as those in the second embodiment, and will not be described again here.

In the method provided in the seventh embodiment, the ONU receives the synchronization packet sent by the OLT, achieves time synchronization with the local clock through Method C or Method D provided in the first embodiment. After the time synchronization with the OLT is achieved, the time synchronization of an SC with the local clock of the ONU is achieved through the PTP synchronization mechanism. Therefore, in the case that a delay from an MC to the SC and a delay from the SC to the MC are different, the time synchronization between the MC and the SC is achieved, thereby satisfying the demand for time synchronization.

In an eighth embodiment, a time synchronization method in a PON is provided. In this embodiment, the PON is an EPON and the synchronization packet is a "synchronization & loop delay configuration MPCP packet". The synchronization packet carries a timestamp TMt1$i$=TMt1 and a loop delay RTTi from an OLT to an ONU/ONT (the $i^{th}$). The RTTi is obtained in an OLT during a distance ranging process defined in the IEEE 802.3ah. The specific distance ranging process is described in related chapters of the IEEE 802.3ah, and will not be described again here. The synchronization packet is as listed in Table 7.

Main difference between the methods in the eighth embodiment and in the seventh embodiment is that the downlink delay Tdi needs to be calculated through Tdi=RTTi/2. Other steps of the method in the eighth embodiment are the same as those in the seventh embodiment, and will not be described again here.

In the method provided in the eighth embodiment, the ONU receives the synchronization packet sent by the OLT and the local clock is adjusted through the method, provided in the seventh embodiment to realize the time synchronization between the local clock and the OLT clock. After the time synchronization with the OLT is achieved, an SC achieves the time synchronization between with the local clock of the ONU through a PTP synchronization mechanism. Therefore, in the case that a delay from an MC to the and a delay from the SC to the MC are different, the time synchronization between the MC and the SC is achieved, thereby satisfying the demand for time synchronization.

In a ninth embodiment, a time synchronization method in a PON is provided. In this embodiment, the PON is an EPON, and a timestamp TMt1$i$ and a downlink delay Tdi are carried in a synchronization MPCP packet (Table 5) and a downlink delay configuration MPCP packet (Table 8) respectively. The synchronization packet is an MPCP packet carrying the timestamp TMt1$i$=TMt1, that is, the "synchronization MPCP packet". The delay configuration packet is an MPCP packet carrying the downlink delay Tdi, that is, the "downlink delay configuration packet".

The methods in the ninth embodiment and in the seventh embodiment are different only in the specific method of Step 32. In this method, as a downlink delay Tdi from an OLT to an ONU/ONT (the $i^{th}$) is transferred by the OLT by using a delay configuration packet, the Tdi needs to be extracted from the delay configuration packet, and the local clock is adjusted according to the timestamp TMt1$i$ and Tdi. Other steps of the method are the same as those in the seventh embodiment.

In the method provided in the ninth embodiment, the ONU receives the synchronization packet and the delay configuration packet sent by the OLT. The local clock of the ONU is adjusted through the method provided in the seventh embodiment, such that the time synchronization between the local clock of the ONU and the OLT clock is achieved. After the time synchronization with the OLT is achieved, an SC achieves the time synchronization with the local clock of the ONU through a PTP synchronization mechanism. Therefore, in the case that a delay from an MC to the SC and a delay from the SC to the MC are different, the time synchronization between the MC and the SC is achieved, thereby satisfying the demand for time synchronization.

In a tenth embodiment, a time synchronization method in a PON is provided. In this embodiment, the PON is an EPON, and the synchronization packet is an MPCP packet carrying a timestamp TMt1$i$=TMt1, that is, the "synchronization MPCP packet". The delay configuration packet is an MPCP packet carrying loop delay information RTTi, that is, "loop delay configuration MPCP packet". A specific structure of the synchronization packet is as listed in Table 5, and a specific structure of the delay configuration packet is as listed in Table 9.

The method in the tenth embodiment is basically the same as the method in the ninth embodiment. However, in this embodiment, as the delay configuration packet carries the loop delay RTTi, Tdi=RTTi/2 is needed and the local clock is adjusted according to the timestamp TMt1$i$ and Tdi. Other steps are the same as those in the ninth embodiment.

In the method provided in the tenth embodiment, the ONU receives the sent synchronization packet and delay configuration packet through the OLT. The local clock of the ONU is adjusted through the method provided in the ninth embodiment, so as to realize the time synchronization of the local clock of the ONU and with the OLT clock. After the time synchronization with the OLT is achieved, the time synchronization between an SC and the local clock of the ONU is achieved through a PTP synchronization mechanism. Therefore, in the case that a delay from an MC to the SC and a delay from the SC to the MC are different, the time synchronization between the MC and the SC is achieved, thereby satisfying the demand for time synchronization.

Figure 15:
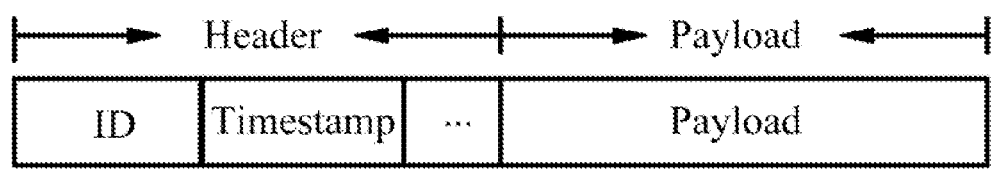
FIG. 15 is a schematic view of a downlink frame according to an embodiment of the present disclosure.

In an eleventh embodiment, a time synchronization method in a PON is provided. A header portion of a data frame carries a timestamp TMt1$i$=TMt1, as shown in FIG. 15, which is a schematic view of a downlink frame according to an embodiment of the present disclosure. The header portion includes an ID field and a timestamp field.

In the eleventh embodiment, if the PON is an EPON, the header portion is a preamble. The preamble carries a timestamp TMt1$i$=TMt1. The method for determining the timestamp TMt1$i$ is the same as the above, and will not be described again here. The delay configuration packet is used to transmit PON delay parameters, for example, one of or a combination of a downlink delay from an OLT to an ONU/ONT, a loop delay between an OLT and an ONU/ONT, and a balance delay of an ONU/ONT. The delay configuration packet is an MPCP packet. The timestamp TMt1$i$ may be carried in an EPON frame. At this time, a specific structure of the preamble is as listed in Table 11, 12 or 13. The timestamp TMt1$i$ may also be carried in two EPON frames. At this time, specific structures of the preambles are as listed in Table 14 and 15 respectively. Table 14 shows a specific structure of a first preamble of the frame carrying the timestamp TMt1$i$, and Table 11 shows a specific structure of a second preamble of the frame carrying the timestamp TMt1$i$. In Tables 11 to 15, the TS_of_S indicates the timestamp TMt1$i$, and meanings of other fields are described in IEEE 802.3 av.

TABLE 11

| | |
|---|---|
| 0xd5 (SLD) | 1 |
| TS_of_S[31:0] | 4 |
| {mode, LLID[14:8]} | 1 |
| LLID[7:0] | 1 |
| CRC8 | 1 |

TABLE 12

| | |
|---|---|
| 0x55 | 1 |
| 0xd5 (SLD) | 1 |
| TS_of_S[23:0] | 3 |
| {mode, LLID[14:8]} | 1 |
| LLID[7:0] | 1 |
| CRC8 | 1 |

TABLE 13

| | |
|---|---|
| 0xd5 (SLD) | 1 |
| 0x55 | 1 |
| TS_of_S[23:0] | 3 |
| {mode, LLID[14:8]} | 1 |
| LLID[7:0] | 1 |
| CRC8 | 1 |

TABLE 14

| | |
|---|---|
| 0x55 | 1 |
| 0x55 | 1 |
| 0xd5 (SLD) | 1 |
| {00, TS_of_S[13:8]} | 1 |
| {TS_of_S[7:0]} | 1 |
| {mode, LLID[14:8]} | 1 |
| LLID[7:0] | 1 |
| CRC8 | 1 |

TABLE 15

| | |
|---|---|
| 0x55 | 1 |
| 0x55 | 1 |
| 0xd5 (SLD) | 1 |
| {11, TS_of_S[27:22]} | 1 |
| {TS_of_S[21:14]} | 1 |
| {mode, LLID[14:8]} | 1 |
| LLID[7:0] | 1 |
| CRC8 | 1 |

The preamble structures in Tables 11 to 15 are exemplary embodiments of the present disclosure. In actual situations, other forms may also be used.

In the eleventh embodiment, if the PON is a GPON, the header portion means a GPON Encapsulation Method (GEM) header. A header structure of the GEM is described in the ITU-T G984.3. A header structure of an existing GEM is modified to carry the timestamp, and the synchronization packet is a PLOAM packet (also referred to as a PLOAM frame).

Figure 11:
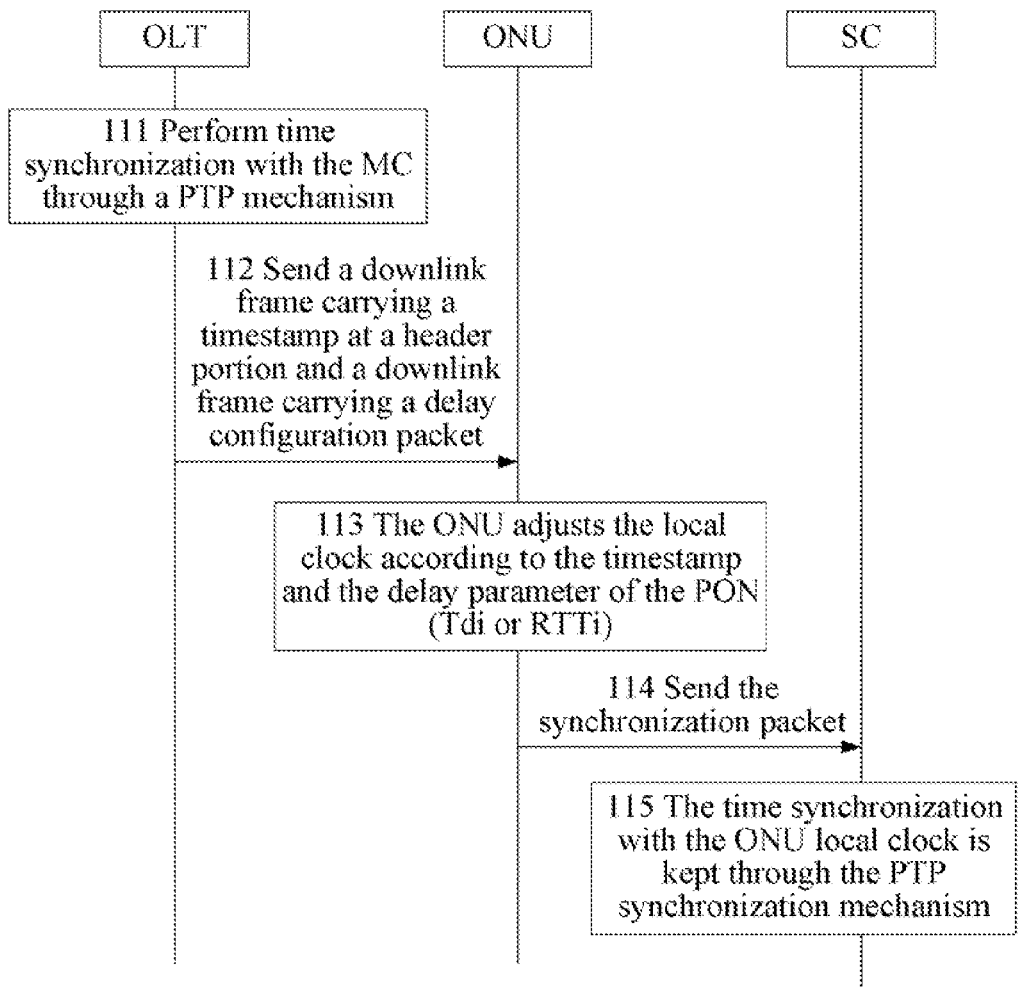
FIG. 11 is a schematic view of a time synchronization method in a PON according to an embodiment of the present disclosure.

The method provided in the eleventh embodiment is as shown in FIG. 11, which includes the following steps.

In Step 111, the OLT performs time synchronization with the MC (not shown in FIG. 11) through a PTP mechanism.

In Step 112, the OLT sends a downlink frame to the ONU/ONT. A header portion of the downlink frame carries the TMt1$i$.

The method for carrying TMt1$i$ is already illustrated in the above, and will not be described again here.

A specific structure of the EPON header is listed in Tables 10 to 14.

The OLT sends the delay configuration packet carried in the downlink frame to the ONU/ONT. Specific structures of the synchronization packet and the delay configuration packet are listed in Table 8 (downlink delay configuration MPCP packet) and Table 9 (loop delay configuration packet).

The delay configuration packet carries a delay Tdi or a loop delay RTTi. The timestamp TMt1i may be carried in a header portion of the delay configuration packet or other packets such as a data packet. The specific method for the header portion to carry the timestamp is illustrated in the above, and will not be described again here.

The delay configuration packet may be sent only once after the distance ranging is completed. The ONU stores the Tdi or RTTi carried therein.

The OLT may send a delay configuration packet to the ONU/ONT according to configurations.

In Step 113, the ONU/ONT adjusts the local clock according to the timestamp and the delay parameter of the PON (Tdi or RTTi).

If the delay configuration packet carries Tdi, the local clock is adjusted through Method G or H, so as to achieve time synchronization with the OLT.

In Method I, the ONU/ONT adjusts the local clock TSu1 to TMt1$i$+Tdi.

In Method J, the ONU/ONT adjusts the local clock TSu1 to TMt1$i$+Tdi+Tpi.

If the delay configuration packet carries the RTTi, the local clock is adjusted through Method I or J, so as to achieve the time synchronization with the OLT.

In Method K, the ONU/ONT adjusts the local clock Tsu1 to TMt1$i$+RTTi/2.

In Method L, the ONU/ONT adjusts the local clock Tsu1 to TMt1$i$+RTTi/2+Tpi.

In Step 114, the ONU/ONT instructs an SC to perform time synchronization.

A method for implementing Step 114 may be adopted to perform time synchronization through a PTP synchronization mechanism.

In the method provided in the eleventh embodiment, the OLT carries the timestamp TMt1$i$=TMt1 and the delay configuration packet in the header portion of the downlink frame. The delay configuration packet carries a PON delay parameter (Tdi or RTTi). The local clock is adjusted according to the timestamp and the PON delay parameter (Tdi or RTTi). After the time synchronization with the OLT is performed, the is instructed to perform time synchronization. Therefore, in the case that a delay from the MC to the SC and a delay from the SC to the MC are different, the time synchronization between the MC and the SC is achieved, thereby satisfying the demand for time synchronization.

Figure 12:
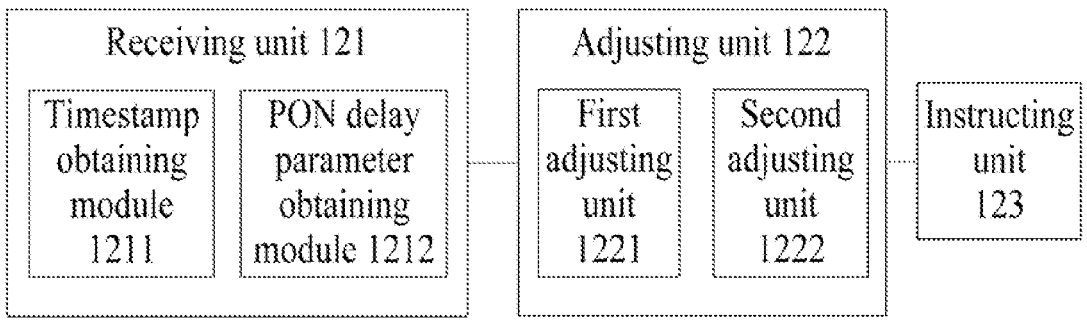
FIG. 12 is a structural view of a time synchronization device in a PON according to an embodiment of the present disclosure.

In an embodiment, the present disclosure further provides a time synchronization device in a PON. The device is as shown in FIG. 12, which includes a receiving unit 121, an adjusting unit 122, and an instructing unit 123. The receiving unit 121 is configured to receive a downlink frame carrying a timestamp TMt1$i$=TMt1 in a header portion of the downlink frame and a delay configuration packet based on the control and/or management protocol sent after the time synchronization between an OLT and an MC is achieved, in which the delay configuration packet carries a PON delay parameter, for example, a downlink delay Tdi from an OLT to an ONU/ONT or a loop delay RTTi between the OLT and the ONU/ONT. The adjusting unit 122 is configured to adjust the local clock according to the timestamp and the PON delay parameter received by the receiving unit 121. The instructing unit 123 is configured to instruct an SC to perform time synchronization after the adjusting unit 122 completes the local clock adjustment.

The receiving unit 121 may also include a timestamp obtaining module 1211 and a PON delay parameter obtaining module 1212.

The timestamp obtaining module 1211 is configured to detect a header portion of a downlink frame to obtain a timestamp TMt1$i$ carried in the header portion.

The PON delay parameter obtaining module 1212 is configured to parse a downlink frame to obtain a PON delay parameter carried in a configuration packet based on the control and/or management protocol in the downlink frame, for example, a downlink delay Tdi or a loop delay RTTi.

The receiving unit 121 may receive the delay configuration packet and store the PON delay parameter carried in the delay configuration packet on a storage medium of the ONU/ONT.

The adjusting unit 122 may include a first adjusting unit 1221, a second adjusting unit 1222.

The first adjusting unit 1221 is configured to adjust the local clock according to the timestamp TMt1$i$ and Tdi when the PON delay parameter obtaining module 1212 in the receiving unit 121 provides the downlink delay Tdi. Specifically. Method G or H may be used.

The second adjusting unit 1222 is configured to adjust the local clock according to the timestamp TMt1$i$ and RTTi when the PON delay parameter obtaining module 1212 in the receiving unit 121 provides the loop delay RTTi. Specifically, Method I or J may be used.

The instructing unit 123 is configured to instruct the SC to achieve time synchronization with the local clock through a PTP synchronization mechanism.

For the device provided in the embodiment of the present disclosure, the timestamp obtaining module 1211 performs the physical layer detection, which does not need protocol processing. The PON delay parameter obtaining module 1212 involves protocol processing. In addition, the timestamp obtaining module 1211 may send the timestamp in real time during normal downlink data transmission. The times or frequency that the PON delay parameter obtaining module 1212 sends the PON delay parameters may be controlled at a low level. For example, the PON delay parameters are only sent after distance ranging is completed or when the ONU/ONT is updated, ensuring a relatively low system overhead.

Figure 13:
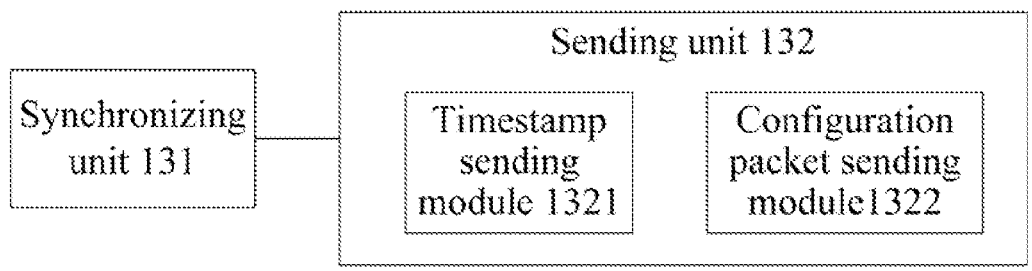
FIG. 13 is a structural view of an OLT according to an embodiment of the present disclosure.

In an embodiment, the present disclosure further provides an OLT. As shown in FIG. 13, the OLT includes a synchronizing unit 131 and a sending unit 132. The synchronizing unit 131 is configured to achieve time synchronization with the MC. The sending unit 132 is configured to send the downlink frame carrying the timestamp TMt1$i$ in the header portion and the delay configuration packet carrying the PON delay parameter after the synchronizing unit 131 completes the time synchronization. The delay configuration packet is based on the PON control and/or management protocol and carries the downlink delay Tdi or the loop delay RTTi.

The sending unit 131 may further include a timestamp sending module 1311 and a configuration packet sending module.

The timestamp sending module 1311 is configured to insert the obtained timestamp TMt1$i$ in the header portion of the downlink frame.

The configuration packet sending module 1312 is configured to generate a configuration packet according to the PON delay parameter. The configuration packet is based on the control and/or management protocol. Here, the PON delay parameter includes, but is not limited to, the downlink delay Tdi or the loop delay RTTi.

In the equipment provided in the embodiment of the present disclosure, after the synchronizing unit 131 achieves the time synchronization with the MC, the sending unit 132 sends the downlink frame carrying the timestamp TMt1$i$ in the header. For the delay configuration packet carrying the PON delay parameter, the timestamp sending is at the physical layer, which does not need protocol processing such that the speed is higher; the sending of the PON delay parameter involves protocol processing, and this embodiment can enhance the accuracy. In addition, a timestamp may be sent in real time during normal downlink data transmission, and the times or frequency of sending the PON delay parameter may be controlled at a low level. For example, the PON delay parameter is only sent after the distance ranging is completed or when the ONU/ONT is updated, ensuring a relatively low system overhead.

Figure 14:
FIG. 14 is a schematic view of a time synchronization system in a PON according to an embodiment of the present disclosure.

In an embodiment, the present disclosure further provides a time synchronization system in a PON. As shown in FIG. 14, the system includes an MC 141, an ONU/ONT 142, an OLT 143, and an SC 144.

The OLT 143 is configured to achieve time synchronization with the MC. After the time synchronization is completed, a downlink frame carrying TMt1$i$ in the header and a delay configuration packet are sent. The delay configuration packet carries a PON delay parameter, for example, a downlink delay Tdi or a loop delay RTTi.

The ONU/ONT 142 is configured to receive a downlink frame carrying a timestamp in the header portion and a delay configuration packet carrying the PON delay parameter, adjust the local clock according to the timestamp TMt1$i$ and the PON delay parameter, and instruct an SC to perform time synchronization after the time synchronization with the OLT 143 is achieved. The local clock may be adjusted according to the timestamp TMt1$i$ and the PON delay parameter, that is, the Tdi or RTTi, through Method I, or J, or K, or L.

In another embodiment of the present disclosure (not shown), the MC 141 may be disposed at the OLT 143 and the SC may be disposed at the ONU/ONT 142.

In the time synchronization system in a PON provided in the embodiment of the present disclosure, after the time synchronization of the OLT 143 with the MC 141 is achieved, a downlink frame carrying a timestamp TMt1$i$ in a preamble and a delay configuration packet carrying the PON delay parameter are sent. The delay configuration packet is a data frame based on a PON control and/or management protocol. The ONU/ONT 142 receives the downlink frame carrying the timestamp TMt1$i$ in the header portion and the delay configuration packet carrying the PON delay parameter, adjusts the local clock according to the timestamp TMt1$i$ and the PON delay parameter, and instructs the SC 144 to perform time synchronization. Therefore, the system supports the foregoing methods and devices, and in the case that a delay from the MC to the SC and a delay from the SC to the MC are different, the time synchronization between the MC and the SC is achieved, thereby satisfying the demand for time synchronization.

In the eleventh embodiment, the PON may also be a PON of other protocols. At this time, the foregoing implementation methods and modes are still applicable.

In a twelfth embodiment, a time synchronization method in a PON is provided. A technical scenario in this embodiment is that the PON is an EPON, the synchronization packet is an MPCP packet (or an MPCP frame), and the delay configuration packet is also an MPCP packet. The synchronization packet carries timestamps TMt1$i$=TMt1 and TSj. The TMt1$i$ is a sending time of the MPCP packet when Timestamp=TSj. The delay configuration packet carries the PON delay parameter such as Tdi or RTTi. A specific structure of the delay configuration packet is described in the ninth and tenth embodiments. The synchronization packet is as listed in Table 16. The TMt1$i$ (the unit is 1 s) in the table represents TMt1$i$, that is, a sending time of the j$^{th}$ MPCP packet.

TABLE 16

| Field | Value | Length |
|---|---|---|
| DA | XX | 6 |
| SA | XX | 6 |
| Length/Type | 88-08 | 2 |
| Opcode | 00-02 | 2 |
| Timestamp | XX | 4 |
| Grant/Flag | 00 | 1 |
| TS/Delay | 8x | 1 |
| TSj (unit is 16 ns) | xx | 4 |
| TMtli (unit is 1 μs) | XX | 8 |
| Pad | | 26 |
| FCS | | 4 |

The structure of the synchronization packet in Table 16 is an exemplary embodiment of the present disclosure. In actual situations, other forms may also be used.

The method in the twelfth embodiment is only different from the method in the ninth embodiment (the delay configuration packet carries Tdi) and the tenth embodiment (the delay configuration packet carries RTTi) in that TSj is added in the MPCP synchronization packet, and the TSj in the synchronization packet needs corresponding processing at the ONU and ONT end. Other steps are the same as those in the ninth embodiment (the delay configuration packet carries Tdi) and the tenth embodiment (the delay configuration packet carries RTTi), and will not be described again here.

The calculation of the timestamps TMt1$i$ and TSj in the synchronization packet is illustrated in the foregoing, and will not be described again here.

A sending frequency of the synchronization packet is illustrated in the fourth embodiment, and will not be described again here.

How the ONU/ONT end processes the TSj in the synchronization packet correspondingly is described in the following.

According to the EPON standard IEEE 802.3ah, the MPCP packet carries the timestamp (the unit is 16 ns) and is sent according to configurations. After the EPON distance ranging is completed, the time synchronization between an OLT and the ONU/ONT is actually achieved, that is, TS$_{ONU}$=TS$_{OLT}$. However, as the transmission between the OLT and the ONU/ONT needs time, actually a fixed offset value offset=Tdi exists between the ONU/ONT and the OLT on the absolute clock. In addition, as a timestamp counter is 32 bits, the time indication capability is only 69 seconds ($2^{32}*16*10^{-9}$=68.719476736 seconds). Therefore, although the OLT and the ONU are synchronous, the actual time needs to be aligned through the method in the present disclosure. Therefore, in the case that the OLT and the ONU are totally synchronous, a local timestamp TSui that the ONU/ONT receives the MPCP packet and a timestamp (the unit is 16 ns) carried in the MPCP packet are the same. The timestamp carried in the MPCP packet is set to TSti, that is, TSui=TSti. At this time, the local clock TSui_realtime of the ONU/ONT should be adjusted as follows:

$$TSui\_realtime=TMt1i+(TSui-TSj)+Tdi$$

or $$Tsui\_realtime=TMt1i+(Tsui-TSj)+RTTi/2.$$

Here, Tdi and RTTi are a downlink delay from the OLT to the ONU/ONT and a loop delay between the OLT and the ONU/ONT respectively. In the embodiment of the present disclosure, the whole PON serves as a clock node between an MC and an SC. Especially, in an exemplary embodiment of the present disclosure, the PTP synchronization mechanism is terminated at an input side of the OLT, and the PTP is enabled at an output end of the ONU/ONT. No new time synchronization protocol needs to be introduced into the PON, that is, between the OLT and the ONU/ONT. Instead, the PON control and/or management protocol is used for time synchronization, so as to realize the time synchronization between the OLT and the ONU/ONT, thereby accomplishing the time synchronization of the SC with the MC through the PON.

In a thirteenth embodiment, a time synchronization method in a PON is provided. A technical scenario in this embodiment is that a PON is an EPON and the synchronization packet is an MPCP packet (or an MPCP frame). The synchronization packet carries a timestamp TMt1$i$, the calculation method of which is illustrated in detail in the first embodiment, that is, TMt1$i$=TMt1+Tdi or TMt1$i$=TMt1+Tdi+Tc, and Tdi=RTTi/2. The synchronization packet is as listed in Table 16.

The synchronization packet in the thirteenth embodiment is the MPCP synchronization packet in the sixth embodiment added with TSj added. At an ONU and ONT end, the TSj in the synchronization packet needs to be processed correspondingly. Other steps are the same as those in the sixth embodiment, and will not be described again here.

The calculation of the timestamps TMt1$i$ and TSj of the synchronization packet is illustrated in the foregoing, and will not be described again here.

The sending frequency of the synchronization packet is illustrated in the fourth embodiment, and will not be described again here.

How the ONU/ONT end processes TSj in the synchronization packet correspondingly is further described in the following.

The method for processing TSj in the thirteenth embodiment is similar to the method in the twelfth embodiment. The main difference is that the OLT already uses the method of Step 21 in the first embodiment when TMt1$i$ is calculated.

Similar to the twelfth embodiment, in the case that the OLT and the ONU are totally synchronous, a local timestamp TSui when the ONU/ONT receives the MPCP packet is the same as TSj (the unit is lions) carried in the MPCP packet. The TSj carried in the MPCP packet is set to TSti, that is, TSui=TSti. At this time, the ONU/ONT local clock TSui_realtime needs to be adjusted as follows TSui_realtime=TMt1$i$+(TSui-TSj).

TSui and TSj may be equal or different. As discussed in the foregoing, the moment at which the ONU/ONT adjusts the time may depend on specific configurations.

When TSj and TMt1$i$ corresponding to the j$^{th}$ MPCP packet are carried in the (j+N)$^{th}$ MPCP packet and the corresponding Timestamp is Tsui, if the local time adjustment is started when the ONU/ONT receives the (j+N)$^{th}$ MPCP packet. Tsui is greater than TSj.

When TSj and TMt1$i$ corresponding to the j$^{th}$ MPCP packet are carried in the (j–N)$^{th}$ MPCP packet, at this time, Tc used for calculating TMt1 is not 0. Instead, the Tc satisfies the following formula:

$$Tc=TSj-TS\_j-N$$

or $$Tc=TSj-TS\_j-N+\text{Offset\_cal}.$$

Here, Offset_cal is a time offset calculated in consideration that TMt1$i$ is not just sent at the (j–N)$^{th}$ MPCP frame. Moreover, in actual situations, the calculation formula may be transformed or simplified, which will not be described here. At this time, if the local time adjustment is started when the ONU/ONT receives the j$^{th}$ MPCP packet. Tsui is equal to TSj. That is, the ONU/ONT receives the (j–N)$^{th}$ MPCP synchronization packet, extracts TSj and TMt1$i$, and adjusts the local time to TSui_realtime=TMt1$i$ when the MPCP synchronization packet with a timestamp TSj is received.

In some of the embodiments of the present disclosure, the PON may serve as a clock node between an MC and an SC. In some exemplary embodiments of the present disclosure, the PTP synchronization mechanism may be terminated at an input side of the OLT and enabled at an output end of the ONU/ONT. No new time synchronization protocol needs to be introduced into the PON, that is, between the OLT and the ONU/ONT. Instead, the control and/or management protocol of the PON may be used for time synchronization, so as to realize time synchronization between the OLT and the ONU/ONT, thereby achieving the time synchronization of the SC with the MC through the PON.

For the frame sequence number in some embodiments of the present disclosure, according to its applicable technical field, in a GPON downlink frame defined in ITU-T G984 series, a value of a superframe counter of the downlink frame may be regarded as a frame sequence number. In the EPON MPCP packet defined in the 802.3ah, in a certain period, the value of the superframe counter of the downlink frame may be taken as the timestamp carried in the MPCP packet. Therefore, the value of the GPON superframe counter and the timestamp in the EPON may both be taken as a frame sequence number to a certain degree.

The present disclosure provides exemplary embodiments, in the case that a delay from the MC to the SC and a delay from the SC to the MC are different, the time synchronization between the MC and the SC is achieved, thereby satisfying the demand for time synchronization in the PON.

It will be apparent to those skilled in the art that various modifications and variations can be made to the present disclosure without departing from the scope or spirit of the present disclosure. In view of the foregoing, it is intended that the present disclosure covers modifications and variations of this disclosure provided they fall within the scope of the following claims and their equivalents.

What is claimed is:

1. A method for time synchronization in a passive optical network (PON) comprising an optical line terminal (OLT) and a plurality of optical network units (ONUs), the method comprising:
   obtaining, by the OLT, a timestamp TMtli associated with a first downlink frame from the OLT to an ONU and a frame sequence number of the first downlink frame, wherein the frame sequence number is a value derived from a superframe counter;
   sending, by the OLT, the timestamp TMtli and the frame sequence number via an ONU Management and Control Interface (OMCI), wherein the timestamp TMtli and the frame sequence number are used for time synchronization between an ONU and the OLT.

2. The method according to claim 1, wherein the timestamp TMtli is equal to TMt1 or TMt1+Tdi when the OMCI is a unicast packet;
   wherein TMt1 is an OLT time when the OLT sends the first downlink frame, and Tdi is a downlink delay from the OLT to the ONU.

3. The method according to claim 1, wherein the timestamp TMtli is equal to TMt1 when the OMCI is a multicast packet or a broadcast packet; wherein TMt1 is an OLT time when the OLT sends the first downlink frame.

4. A method for transmitting a time synchronization packet in a passive optical network (PON) comprising an optical line terminal (OLT) and a plurality of optical network units (ONUs), the method comprising:
   receiving, by the ONU, a timestamp TMtli associated with a first downlink frame from the OLT to an ONU and a frame sequence number of the first downlink frame via an ONU Management and Control Interface (OMCI);
   wherein the frame sequence number is a value derived from a superframe counter; wherein the timestamp TMtli and the frame sequence number of the first downlink frame are used for time synchronization between an ONU and the OLT.

5. The method according to claim 4, wherein the timestamp TMtli is equal to TMt1 or TMt1+Tdi when the OMCI is a unicast packet;
   wherein TMt1 is an OLT time when the OLT sends the first downlink frame, and Tdi is a downlink delay from the OLT to the ONU.

6. The method according to claim 4, wherein the timestamp TMtli is equal to TMt1 when the OMCI is a multicast packet or a broadcast packet; wherein TMt1 is an OLT time when the OLT sends the first downlink frame.

7. An apparatus for time synchronization in a passive optical network (PON), comprising:
   a time obtaining module configured to obtain a timestamp TMtli associated with a first downlink frame from the OLT to an ONU and a frame sequence number of the first downlink frame, wherein the frame sequence number is a value derived from a superframe counter; and
   a downlink sending module configured to send the timestamp TMtli and the frame sequence number via an ONU Management and Control Interface (OMCI), wherein the timestamp TMtli and the frame sequence number are used for time synchronization between an ONU and the OLT.

8. The apparatus according to claim 7, wherein the timestamp TMtli is equal to TMt1 or TMt1+Tdi when the OMCI is a unicast packet;
   wherein TMt1 is an OLT time when the OLT sends the first downlink frame, and Tdi is a downlink delay from the OLT to the ONU.

9. The apparatus according to claim 7, wherein the timestamp TMtli is equal to TMt1 when the OMCI is a multicast packet or a broadcast packet; wherein TMt1 is an OLT time when the OLT sends the first downlink frame.

10. An apparatus for time synchronization in a passive optical network (PON), comprising:

a receiving unit configured to receive a timestamp TMtli associated with a first downlink frame from the OLT to an ONU and a frame sequence number of the first downlink frame via an ONU Management and Control Interface (OMCI);

wherein the frame sequence number is a value derived from a superframe counter;

wherein the timestamp TMtli and the frame sequence number of the first downlink frame are used for time synchronization between an ONU and the OLT;

an adjusting unit configured to adjust a local clock according to the timestamp TMtli associated with the first downlink frame from the OLT to an ONU and the frame sequence number of the first downlink frame to achieve the time synchronization of the ONU with the OLT.

11. The apparatus according to claim 10, wherein the timestamp TMtli is equal to TMt1 or TMt1+Tdi when the OMCI message is a unicast packet;

wherein TMt1 is an OLT time when the OLT sends the first downlink frame, and Tdi is a downlink delay from the OLT to the ONU.

12. The apparatus according to claim 10, wherein the timestamp TMtli is equal to TMt1 when the OMCI message is a multicast packet or a broadcast packet; wherein TMt1 is an OLT time when the OLT sends the first downlink frame.

13. A passive optical network (PON), comprising:
an optical line terminal (OLT); and
a plurality of optical network units (ONUs), wherein:
the OLT is configured to obtain a timestamp TMtli associated with a first downlink frame from the OLT to an ONU and a frame sequence number of the first downlink frame, wherein the frame sequence number is a value derived from a superframe counter and send the timestamp TMtli and the frame sequence number via an ONU Management and Control Interface (OMCI), wherein the timestamp TMtli and the frame sequence number are used for time synchronization between an ONU and the OLT;
the ONU is configured to receive the timestamp TMtli associated with the first downlink frame from the OLT to an ONU and the frame sequence number of the first downlink frame via the OMCI and adjust a local clock according to the timestamp TMtli associated with the first downlink frame from the OLT to an ONU and the frame sequence number of the first downlink frame to achieve the time synchronization of the ONU with the OLT.

14. The PON according to claim 13, wherein the timestamp TMtli is equal to TMt1 or TMt1+Tdi when the OMCI is a unicast packet;

wherein TMt1 is an OLT time when the OLT sends the first downlink frame, and Tdi is a downlink delay from the OLT to the ONU.

15. The PON according to claim 13, wherein the timestamp TMtli is equal to TMt1 when the OMCI is a multicast packet or a broadcast packet; wherein TMt1 is an OLT time when the OLT sends the first downlink frame.

16. An apparatus for time synchronization in a passive optical network (PON), comprising:
at least one processor and a memory coupled to the at least one processor;
wherein the at least one processor is configured to obtain a timestamp TMtli associated with a first downlink frame from the OLT to an ONU and a frame sequence number of the first downlink frame, wherein the frame sequence number is a value derived from a superframe counter and send the timestamp TMtli and the frame sequence number via an ONU Management and Control Interface (OMCI), wherein the timestamp TMtli and the frame sequence number are used for time synchronization between an ONU and the OLT.

17. The apparatus according to claim 16, wherein the timestamp TMtli is equal to TMt1 or TMt1+Tdi when the OMCI is a unicast packet;

wherein TMt1 is an OLT time when the OLT sends the first downlink frame, and Tdi is a downlink delay from the OLT to the ONU.

18. The apparatus according to claim 16, wherein the timestamp TMtli is equal to TMt1 when the OMCI is a multicast packet or a broadcast packet; wherein TMt1 is an OLT time when the OLT sends the first downlink frame.

19. An apparatus for time synchronization in a passive optical network (PON), comprising:
at least one processor and a memory coupled to the at least one processor;
wherein the at least one processor is configured to receive a timestamp TMtli associated with a first downlink frame from the OLT to an ONU and a frame sequence number of the first downlink frame via an ONU Management and Control Interface (OMCI); wherein the frame sequence number is a value derived from a superframe counter; wherein the timestamp TMtli and the frame sequence number of the first downlink frame are used for time synchronization between an ONU and the OLT.

20. The apparatus according to claim 19, wherein the timestamp TMtli is equal to TMt1 or TMt1+Tdi when the OMCI is a unicast packet;

wherein TMt1 is an OLT time when the OLT sends the first downlink frame, and Tdi is a downlink delay from the OLT to the ONU.

21. The apparatus according to claim 19, wherein the timestamp TMtli is equal to TMt1 when the OMCI is a multicast packet or a broadcast packet; wherein TMt1 is an OLT time when the OLT sends the first downlink frame.

* * * * *